(12) United States Patent
Yamada et al.

(10) Patent No.: US 12,536,423 B2
(45) Date of Patent: Jan. 27, 2026

(54) MEMRISTOR AND NEUROMORPHIC DEVICE

(71) Applicant: TDK CORPORATION, Tokyo (JP)

(72) Inventors: Shogo Yamada, Tokyo (JP); Keita Suda, Tokyo (JP); Yukio Terasaki, Tokyo (JP); Tomoyuki Sasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 819 days.

(21) Appl. No.: 17/865,966

(22) Filed: Jul. 15, 2022

(65) Prior Publication Data

US 2024/0020520 A1 Jan. 18, 2024

(51) Int. Cl.
*G06N 3/063* (2023.01)
*H10B 61/00* (2023.01)
*H10N 50/10* (2023.01)
*H10N 50/80* (2023.01)

(52) U.S. Cl.
CPC ............. *G06N 3/063* (2013.01); *H10B 61/22* (2023.02); *H10N 50/10* (2023.02); *H10N 50/80* (2023.02)

(58) Field of Classification Search
CPC ........................................................ G06N 3/063
See application file for complete search history.

(56) References Cited

U.S. PATENT DOCUMENTS 9,934,463 B2 * 4/2018 Seo ..................... G11C 13/0002
10,332,004 B2 * 6/2019 Kataeva ................. G06N 3/063

OTHER PUBLICATIONS

Burr et al.; "Neuromorphic computing using non-volatile memory;" Advances in Physics: X; 2017; pp. 89-124; vol. 2, No. 1.
Shibata et al.; "Linear and symmetric conductance response of magnetic domain wall type spinmemristor for analog neuromorphic computing;" Applied Physics Express; 2020; pp. 043004-1-043004-4; vol. 13, No. 043004.

* cited by examiner

*Primary Examiner* — Van C Mang
(74) *Attorney, Agent, or Firm* — Oliff PLC

(57) ABSTRACT

A memristor includes a first variable conductance element and a second variable conductance element. A minimum value of conductance of the second variable conductance element during reading is larger than a maximum value of conductance of the first variable conductance element during reading. In the memristor, a first read path when the conductance of the first variable conductance element is read merges with a second read path when the conductance of the second variable conductance element is read.

20 Claims, 22 Drawing Sheets

MEMRISTOR AND NEUROMORPHIC DEVICE

BACKGROUND

The present invention relates to a memristor and a neuromorphic device.

A memristor is a passive element that stores electric charge that passes therethrough and has a change in conductance or resistance according to the electric charge. A memristor is a novel passive element, joining resistors, capacitors, and inductors. A memristor outputs the product of an input voltage and its own conductance value as an electric current. For example, as described in Non-Patent Document 1, a memristor can be used in a neuromorphic device that emulates the functions of the brain. Also, Non-Patent Document 2 discloses a spin memristor in which conductance in a lamination direction can change according to a position of a magnetic domain wall and that can store data in multiple values. The spin memristor has excellent linearity and symmetry in an operation and is easily applied to a neuromorphic device.

Non-Patent Documents

[Non-Patent Document 1] Geoffrey W. Burr et al., Advances in Physics. X 2, 2017, Vol. 2, No. 1, 89-124.
[Non-Patent Document 2] T. Shibata et al., Appl. Phys. Express 13, 043004 (2020).

SUMMARY

A memristor includes a first variable conductance element and a second variable conductance element. A minimum value of conductance of the second variable conductance element during reading is larger than a maximum value of conductance of the first variable conductance element during reading. In the memristor, a first read path when the conductance of the first variable conductance element is read merges with a second read path when the conductance of the second variable conductance element is read.

DETAILED DESCRIPTION

Figure 1:
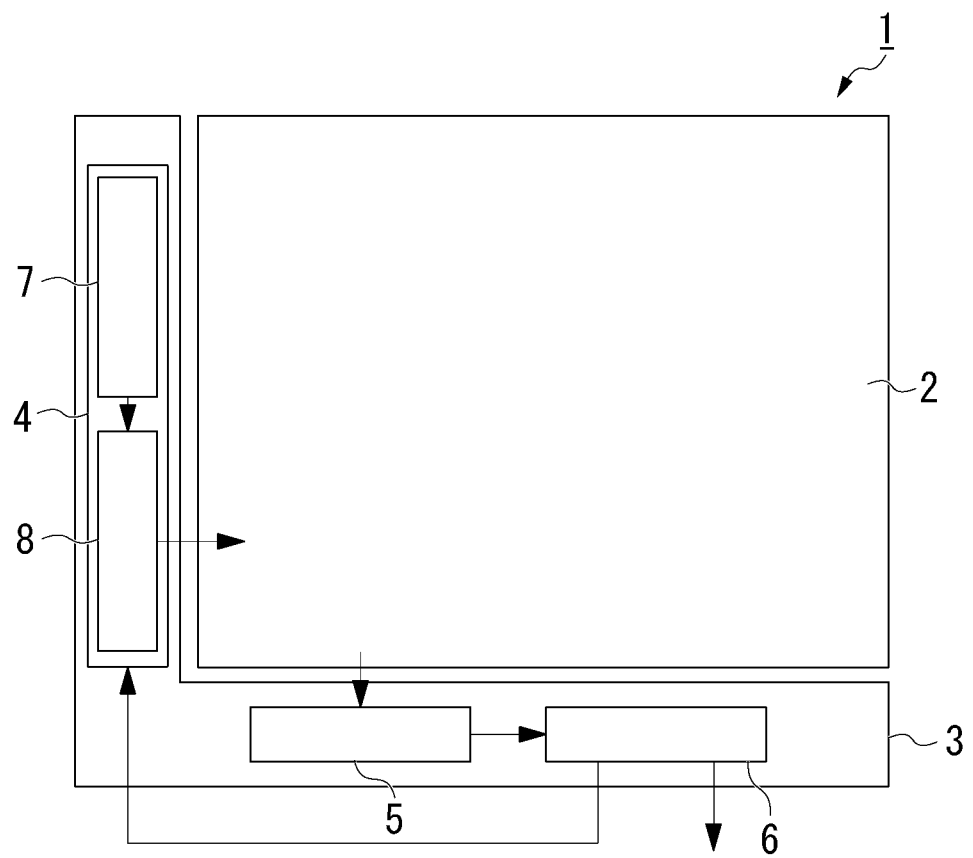
FIG. 1 is a block diagram of a memristor device according to a first embodiment.

Hereinafter, present embodiments will be described in detail with reference to the drawings as appropriate. In the drawings used in the following description, featured parts may be enlarged for convenience such that the features of the present invention are easier to understand, and dimensional ratios and the like of the respective components may be different from actual ones. Materials, dimensions, and the like exemplified in the following description are examples, the present invention is not limited thereto, and modifications can be appropriately made in a range in which advantageous effects of the present invention are exhibited.

First, directions will be defined. An x-direction and a y-direction are directions substantially parallel to one surface of a substrate Sub (see, for example, FIG. 3) to be described below. The x-direction is, for example, a direction in which a magnetic recording layer extends. The y-direction is a direction perpendicular to the x-direction. A z-direction is a direction from the substrate Sub to a variable conductance element. Although a +z-direction may be expressed as an "upward direction" and a −z-direction may be expressed as a "downward direction" in the present specification, these expressions are for convenience only and do not specify the direction of gravity. In the present specification, "extension in the x-direction" indicates, for example, that a dimension in the x-direction is larger than a minimum dimension among dimensions in the x-direction, the y-direction, and the z-direction. The same is true for the case of extension in another direction. Also, the term "connection" as used herein is not limited to a direct connection and includes a connection via another physical object.

First Embodiment

FIG. 1 is a block diagram of a memristor device 1 according to a first embodiment. The memristor device 1 has a memristor array 2 and a control device 3.

Figure 2:
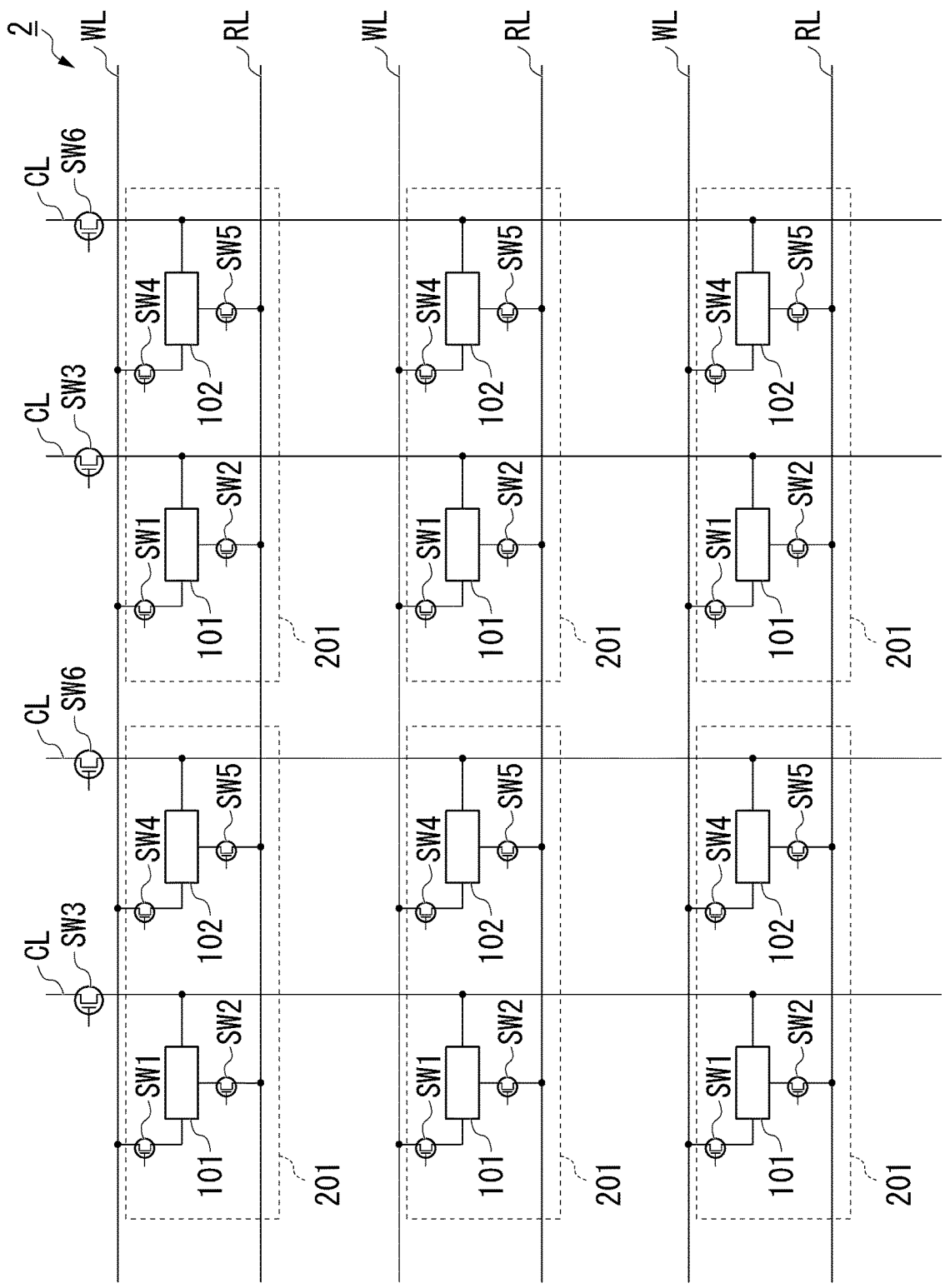
FIG. 2 is a circuit diagram of a memristor array according to the first embodiment.

The memristor array 2 has a plurality of memristors 201 (see FIG. 2). The control device 3 controls an operation of each memristor 201 of the memristor array 2. The control device 3 may be arranged near the memristor array 2, for example, as shown in FIG. 1. Also, the control device 3 may be arranged at a position overlapping the memristor array 2 in the z-direction.

The control device 3 has, for example, a signal input unit 4, a calculation unit 5, and an output unit 6.

The signal input unit 4 has a control unit 7 and a power supply 8. The control unit 7 has, for example, a processor and a memory. The processor is, for example, a central processing unit (CPU). The processor controls, for example, an address of an element to which a pulse is applied, a potential of the element to which the pulse is applied, a magnitude (a voltage or a pulse length) of the pulse applied to the element, and the like. The memory stores an address of the element, a program for operating the processor, and the like.

The calculation unit 5 performs calculations on the basis of the conductance of each element or an output current from each element within the memristor array 2. The calculation unit 5 has, for example, a processor. For example, the calculation unit 5 adds up output currents from a plurality of elements in the memristor array 2. When the memristor device 1 is applied to a neural network, the calculation unit 5 may substitute a result of adding up the output currents from the plurality of elements into an activation function.

The output unit 6 is connected to the calculation unit 5. The output unit 6 externally outputs a calculation result of the calculation unit 5. The output unit 6 has, for example, an output capacitor, an amplifier, a converter, and the like. Also, the output unit 6 may also feed the calculation result back to the signal input unit 4. For example, the calculation result is stored in the memory of the signal input unit 4.

FIG. 2 is a circuit diagram of the memristor array 2 according to the first embodiment. The memristor array 2 includes a plurality of memristors 201, a plurality of first wirings WL, a plurality of second wirings CL, and a plurality of third wirings RL. Switching elements SW1, SW2, SW3, SW4, SW5, and SW6 for controlling the operation of the memristors 201 are connected to the memristors 201. The switching elements SW1, SW2, SW4, and SW5 are arranged, for example, within the memristor array 2, and the switching elements SW3 and SW6 are arranged within the signal input unit 4 of the control device 3.

Each of the first wirings WL is a write wiring. Each of the variable conductance elements 101 and 102 and the signal input unit 4 are electrically connected by any first wiring WL. Each of the second wirings CL is a common wiring that can be used both when a signal is written and when a signal is read. For example, each of the second wirings CL is connected to the signal input unit 4 or the calculation unit 5. Although the second wiring CL shown in FIG. 2 is connected across a plurality of variable conductance elements 101 or a plurality of variable conductance elements 102, the second wiring CL may be connected to each of the variable conductance elements 101 and 102. Although an example in which the variable conductance element 101 and the variable conductance element 102 are connected to different second wirings CL is shown in FIG. 2, the variable conductance element 101 and the variable conductance element 102 may be connected to the same second wiring CL. Each of the third wirings RL is a read wiring. Each of the variable conductance elements 101 and 102 and the calculation unit 5 are electrically connected by the third wiring RL.

Each of the switching elements SW1, SW2, SW3, SW4, SW5, and SW6 is an element that controls a flow of an electric current. Each of the switching elements SW1, SW2, SW3, SW4, SW5, and SW6 is, for example, a transistor, an element using a phase change in a crystal layer such as an ovonic threshold switch (OTS), an element using a band structure change such as a metal-insulator transition (MIT) switch, an element using a breakdown voltage such as a Zener diode or an avalanche diode, or an element whose conductivity changes with an atomic position.

A connection relationship between the variable conductance element 101 or the variable conductance element 102 and each of the switching elements SW1, SW2, SW3, SW4, SW5, and SW6 is not limited to the configuration of FIG. 2. The arrangement of the switching elements SW1, SW2, SW3, SW4, SW5, and SW6 is arbitrary as long as the write current or the read current applied to each of the variable conductance element 101 and the variable conductance element 102 can be controlled.

For example, the switching element SW3 may be arranged between each variable conductance element 101 and the second wiring CL and the switching element SW6 may be arranged between each variable conductance element 102 and the second wiring CL. It is preferable to decrease the number of switching elements arranged within the memristor array 2 such that the degree of integration within the memristor array 2 is increased.

Figure 3:
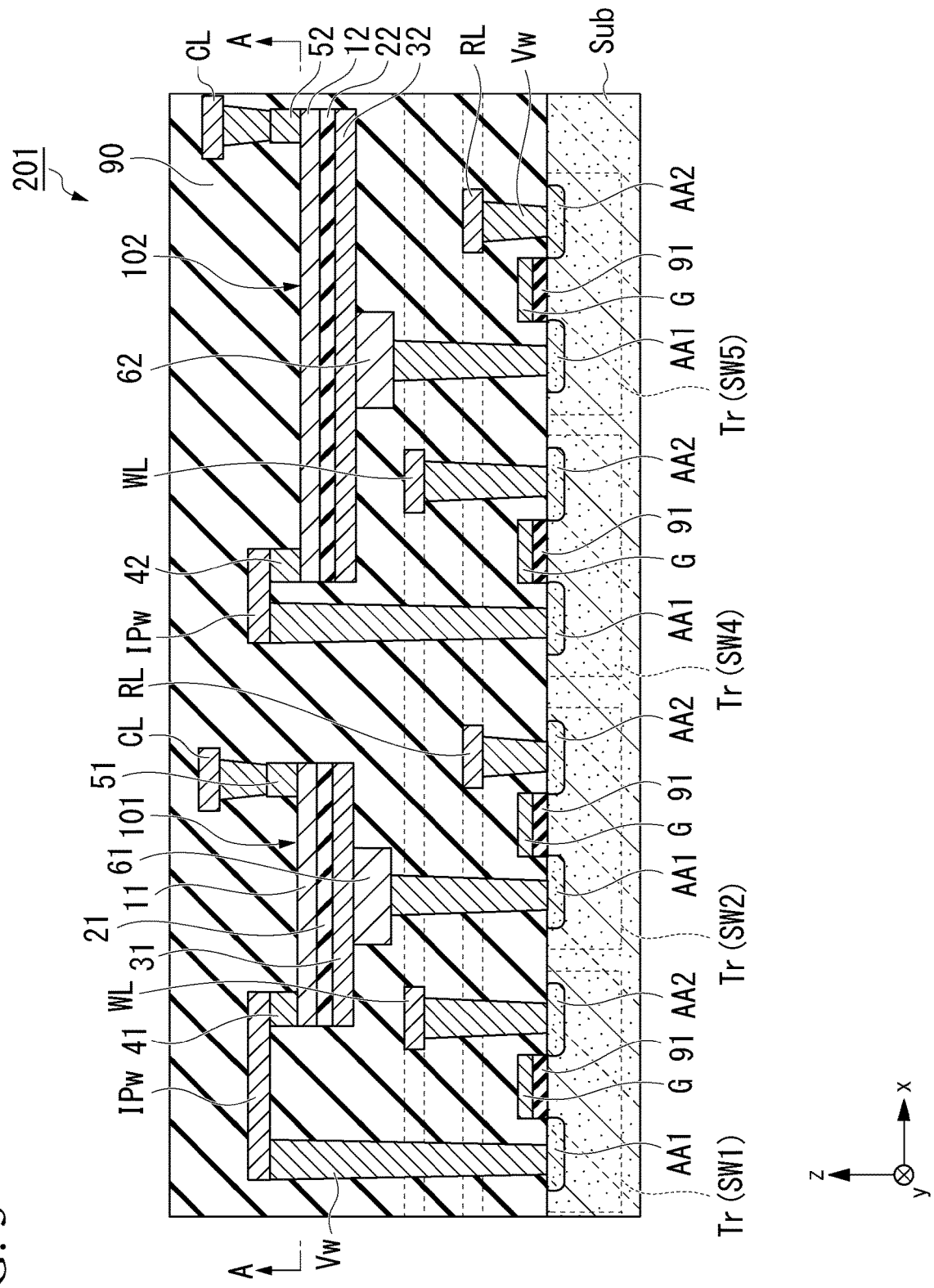
FIG. 3 is a cross-sectional view of a memristor according to the first embodiment.

FIG. 3 is a cross-sectional view of the memristor 201 according to the first embodiment. FIG. 3 is a cross-section cut along an xz-plane passing through the center of the memristor 201 in the y-direction and is a cross-section cut along a line B-B of FIG. 4.

The memristor 201 has a variable conductance element 101 and a variable conductance element 102. The variable conductance element 101 is an example of a first variable conductance element. The variable conductance element 102 is an example of a second variable conductance element. The variable conductance element 101 and the variable conductance element 102 are, for example, at the same height position in the z-direction.

The variable conductance element 101 is connected to the switching elements SW1, SW2, and SW3. The switching element SW3 is at a different position in the y-direction of FIG. 3. The variable conductance element 102 is connected to the switching elements SW4, SW5, and SW6. The switching element SW6 is at a different position in the y-direction of FIG. 3.

The switching elements SW1, SW2, SW4 and SW5 shown in FIG. 3 are transistors Tr. The transistor Tr includes a gate electrode G, an insulating film 91, an active region AA1, and an active region AA2. The active region AA1 and the active region AA2 are formed in the substrate Sub and serve as a source or a drain according to a direction of a flow of an electric current. The substrate Sub is, for example, a semiconductor substrate.

The transistor Tr and the variable conductance element 101 or the variable conductance element 102 are connected by wiring. The wiring includes a via wiring Vw extending in the z-direction and an in-plane wiring IPw extending in any direction in the xy-plane. Aside from the wiring, there is an insulating layer 90 between the transistor Tr and the variable conductance element 101 or the variable conductance element 102.

The insulating layer 90 is an insulating layer that is insulated between wirings of multilayer wiring and between elements. The variable conductance element 101 or the variable conductance element 102 and the transistor Tr are electrically separated by the insulating layer 90 except at the via wiring Vw. The insulating layer 90 is made of, for example, silicon oxide ($SiO_x$), silicon nitride ($SiN_x$), silicon carbide (SiC), chromium nitride, silicon carbonitride (SiCN), silicon oxynitride (SiON), aluminum oxide ($Al_2O_3$), zirconium oxide ($ZrO_x$), or the like.

Figure 4:
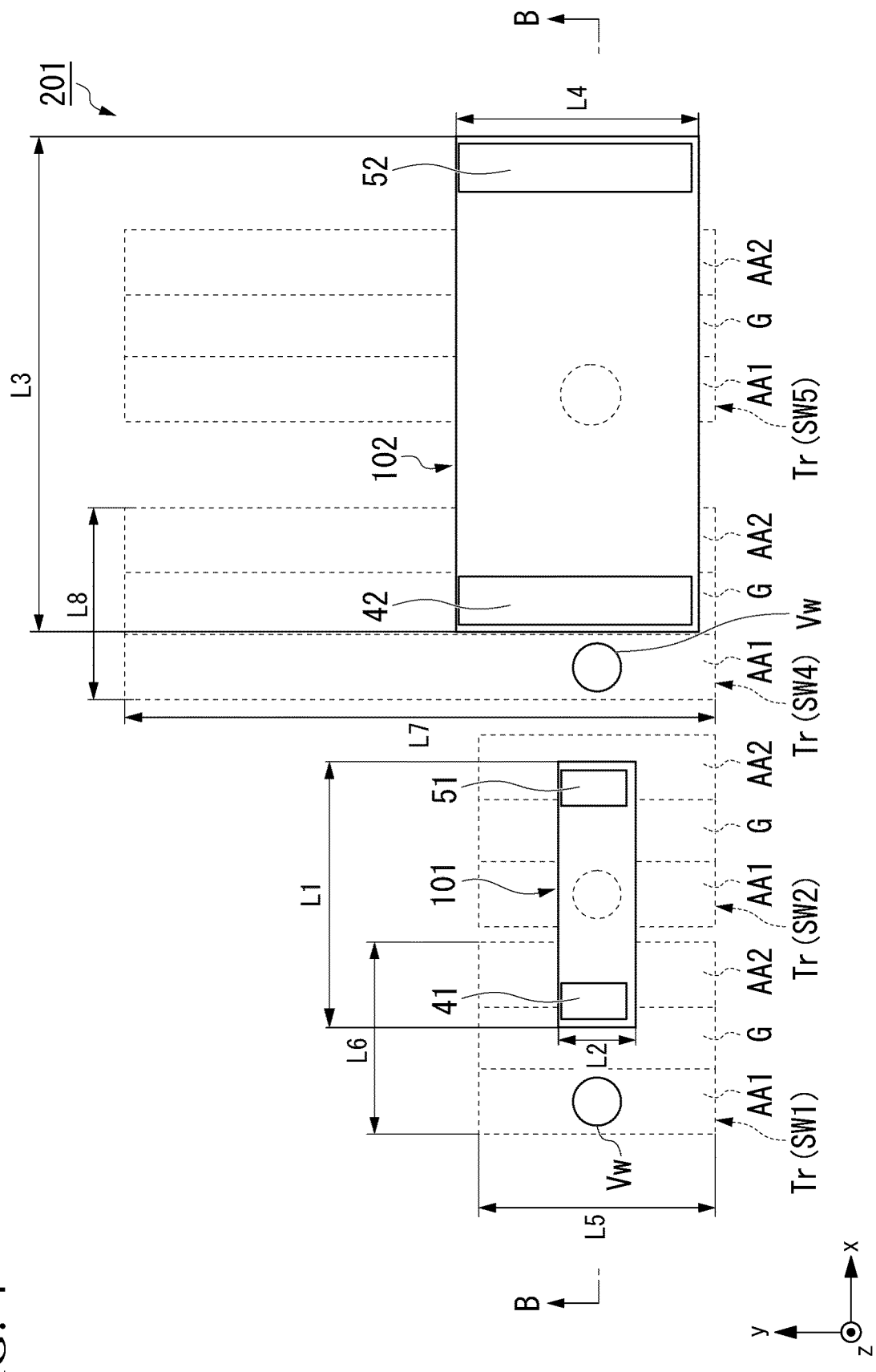
FIG. 4 is a plan view of the memristor according to the first embodiment.

FIG. 4 is a view of a plane cut along the xy-plane passing through an upper surface of the variable conductance element 101 of the memristor 201 when viewed from above in the z-direction and is a view of a cross-section cut along a line A-A of FIG. 3 when viewed from above in the z-direction.

The variable conductance element 101 has, for example, a rectangular shape in which a length L1 in the x-direction is longer than a length L2 in the y-direction when viewed from above in the z-direction. The length L2 is, for example, a length of the variable conductance element 101 in a first width direction perpendicular to a line segment connecting an electrode 41 and an electrode 51. The variable conductance element 102 has, for example, a rectangular shape in which a length L3 in the x-direction is longer than a length L4 in the y-direction when viewed from above in the z-direction. The length L4 is, for example, the length of the variable conductance element 102 in a second width direction perpendicular to a line segment connecting an electrode 42 and an electrode 52. For example, the length L1 of the variable conductance element 101 is shorter than the length L3 of the variable conductance element 102. For example, the length L2 of the variable conductance element 101 is shorter than the length L4 of the variable conductance element 102. In the present specification, the term "substantially the same" indicates that a deviation of 10% or less is permitted on the basis of one side.

An area occupied by the variable conductance element 101 when viewed from above in the z-direction is smaller than an area occupied by the variable conductance element 102 when viewed from above in the z-direction. An area occupied by the variable conductance element 101 when viewed from above in the z-direction is preferably less than half an area occupied by the variable conductance element 102 when viewed from above in the z-direction. The variable conductance element 101 and the variable conductance element 102 have different sizes and different widths of conductance that they can take. During reading, for example, a maximum value of conductance of the variable conductance element 101 is smaller than a minimum value of conductance of the variable conductance element 102. If the area occupied by the variable conductance element 101 is sufficiently smaller than the area occupied by the variable conductance element 102, the above-described conductance relationship is easily satisfied.

The variable conductance element 101 is connected to the switching element SW1 and the switching element SW2. The switching element SW1 controls a flow of a write current for the variable conductance element 101. The switching element SW1 is an example of a first switching element. The switching element SW2 controls a flow of a read current for the variable conductance element 101.

The variable conductance element 102 is connected to the switching elements SW4 and SW5. The switching element SW4 controls a flow of a write current for the variable conductance element 102. The switching element SW5 is an example of a second switching element. The switching element SW5 controls a flow of a read current for the variable conductance element 102.

A maximum rated current value of the transistor Tr differs according to a magnitude of the transistor Tr. The maximum rated current value is a maximum value of an electric current that can flow through the transistor Tr normally. A length L5 of the switching element SW1 in the y-direction is shorter than a length L7 of the switching element SW4 in the y-direction. A length L6 of the switching element SW1 in the x-direction is substantially the same as a length L8 of the switching element SW4 in the x-direction. When viewed from above in the z-direction, an area occupied by the switching element SW1 is smaller than an area occupied by the switching element SW4. The switching element SW4 has a larger maximum rated current value than the switching element SW1. The switching element SW4 can control an electric current sufficient to operate the variable conductance element 102 having a long path along which the write current flows.

In FIG. 4, the area of the switching element SW2 is substantially the same as that of the switching element SW1 and the area of the switching element SW5 is substantially the same as that of the switching element SW4. However, the switching element SW2 and the switching element SW5 are transistors Tr used during reading. The read current is smaller than the write current. Therefore, the area of the switching element SW2 may be smaller than that of the switching element SW1 and the area of the switching element SW5 may be smaller than that of the switching element SW4.

Figure 5:
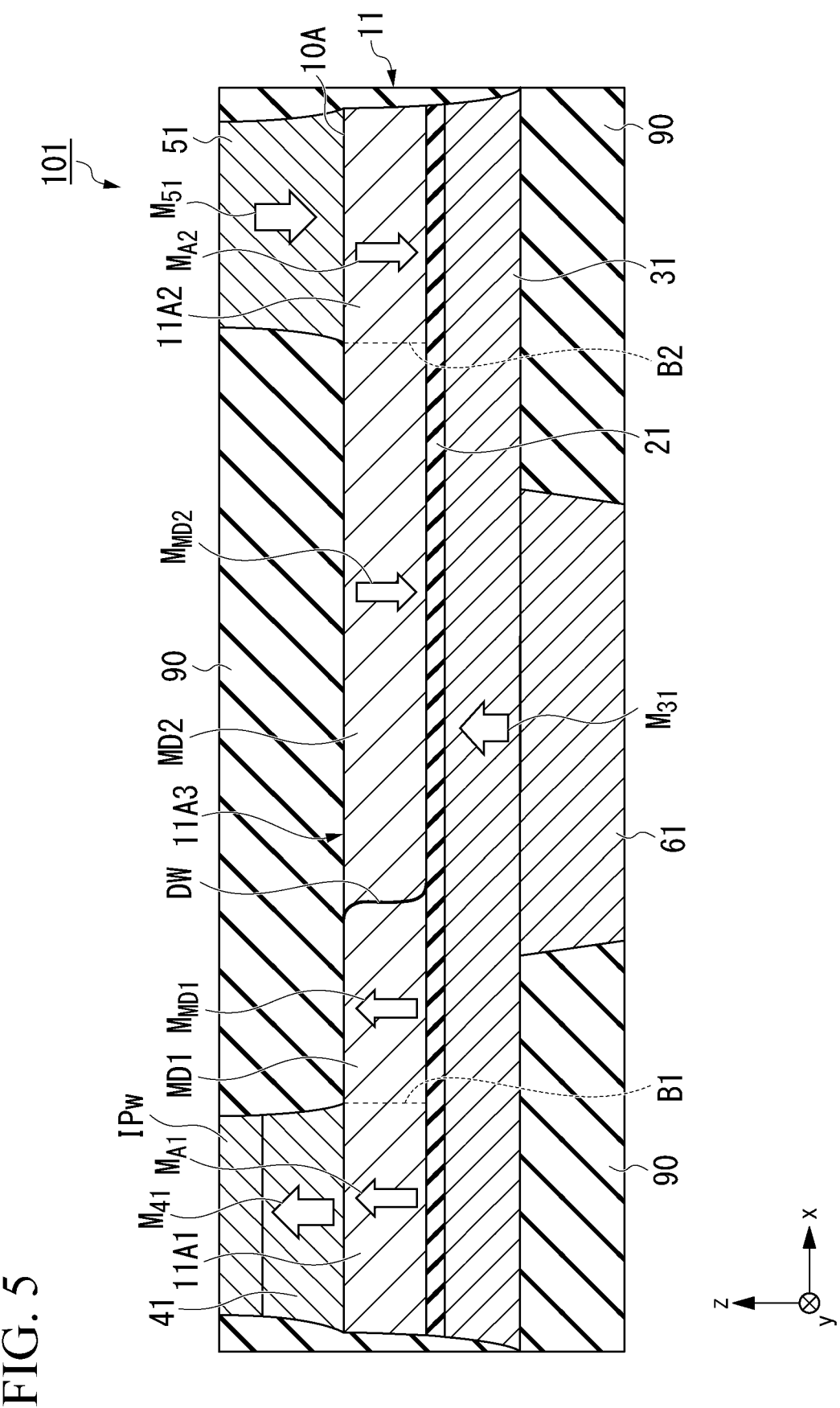
FIG. 5 is a cross-sectional view of a first variable conductance element according to the first embodiment.

FIG. 5 is a cross-sectional view of the variable conductance element 101. FIG. is an xz cross-section passing through the center of the variable conductance element 101 in the y-direction and is a cross-section cut along a line B-B of FIG. 4.

The variable conductance element 101 includes a magnetic recording layer 11, a nonmagnetic layer 21, a reference layer 31, the electrode 41, the electrode 51, and an electrode 61. The variable conductance element 101 is a magnetic domain wall moving element and is also called a spin memristor. During reading, the conductance of the variable conductance element 101 differs according to a position of a magnetic domain wall DW within the magnetic recording layer 11.

The reference layer 31 includes a ferromagnetic member. A reversal of magnetization $M_{31}$ of the reference layer 31 is more difficult than those of magnetizations $M_{MD1}$ and $M_{MD2}$ of the magnetic recording layer 11. The reference layer 31 is closer to the substrate Sub than the magnetic recording layer 11 is. This element is called a bottom pin structure. The reference layer 31 includes, for example, the magnetic recording layer 11 when viewed from the z-direction. When an area of the reference layer 31 is larger than an area of the magnetic recording layer 11, the heat capacity of the reference layer 31 increases and the heat exhaust efficiency from the magnetic recording layer 11 increases. Also, when the area of the reference layer 31 is larger than that of the magnetic recording layer 11, the flatness of the magnetic recording layer 11 is improved and the magnetic domain wall DW moves smoothly.

The reference layer 31 includes, for example, a material that facilitates obtaining a coherent tunnel effect with the magnetic recording layer 11. The reference layer 31 includes, for example, a metal selected from the group consisting of Cr, Mn, Co, Fe, and Ni, an alloy containing one or more of these metals, an alloy containing these metals and at least one or more elements of B, C, and N, or the like. The reference layer 31 is, for example, Co—Fe, Co—Fe—B, or Ni—Fe.

The reference layer 31 may be, for example, a Heusler alloy. The Heusler alloy is a half metal and has high spin polarizability. The Heusler alloy is an intermetallic compound having a chemical composition of XYZ or $X_2YZ$, wherein X is a transition metal element or a noble metal element of the Co, Fe, Ni, or Cu group on the periodic table, Y is a transition metal of the Mn, V, Cr, or Ti group or an elemental species of X, and Z is a typical element of Group III to Group V. Examples of the Heusler alloy include $Co_2FeSi$, $Co_2FeGe$, $Co_2FeGa$, $Co_2MnSi$, $Co_2Mn_{1-a}Fe_aAl_bSi_{1-b}$, $Co_2FeGe_{1-c}Ga_c$, and the like.

Each of the reference layers 31 may have a synthetic antiferromagnetic structure (an SAF structure). The synthetic antiferromagnetic structure includes two magnetic layers sandwiching a nonmagnetic layer. For example, the reference layer 31 may be a laminate of a ferromagnetic layer, a spacer layer, and a ferromagnetic layer. Due to the antiferromagnetic coupling of the two ferromagnetic layers constituting the SAF structure, the coercive force of the reference layer 31 becomes larger than that in the case without the SAF structure. The magnetic layer constituting the SAF structure may include, for example, a ferromagnetic member, and may include an antiferromagnetic member of IrMn, PtMn, or the like. The spacer layer includes, for example, at least one selected from the group consisting of Ru, Ir, and Rh.

The nonmagnetic layer 21 is sandwiched between the reference layer 31 and the magnetic recording layer 11. The nonmagnetic layer 21 is, for example, on the reference layer 31.

The nonmagnetic layer 21 is made of, for example, a nonmagnetic insulator, a semiconductor, or a metal. The nonmagnetic insulator is, for example, $Al_2O_3$, $SiO_2$, $MgO$, $MgAl_2O_4$, and a material in which some of Al, Si, and Mg are replaced with Zn, Be, and the like. These materials have a large bandgap and are excellent in insulating properties. When the nonmagnetic layer 21 is made of a nonmagnetic insulator, the nonmagnetic layer 21 is a tunnel barrier layer. Nonmagnetic metals are, for example, Cu, Au, Ag, and the like. Nonmagnetic semiconductors are, for example, Si, Ge, $CuInSe_2$, $CuGaSe_2$, Cu (In, Ga) See, and the like.

The thickness of the nonmagnetic layer 21 is, for example, 20 Å or more, and may be 25 Å or more. When the thickness of the nonmagnetic layer 21 is thick, the resistance-area product (RA) of the variable conductance element 101 becomes large. The resistance-area product (RA) of the magnetic domain wall moving element 100 is preferably $1\times10^4 \Omega\mu m^2$ or more and more preferably $5\times10^4 \Omega\mu m^2$ or more. The resistance-area product (RA) is represented by the product of element resistance and an element cross-section area. The element cross-section is a cross-section cut along the xy-plane passing the nonmagnetic layer 21.

The magnetic recording layer 11 is on the nonmagnetic layer 21. The magnetic recording layer 11 extends in the x-direction. The magnetic recording layer 11 internally has a magnetic domain wall DW. The magnetic domain wall DW is a boundary between different magnetic domains. The magnetic domain wall DW moves in the x-direction inside the magnetic recording layer 11. The magnetic recording layer is also called an analog layer or a magnetic domain wall moving layer.

The magnetic recording layer 11 has a first region 11A1, a second region 11A2 and a third region 11A3. The first region 11A1 is a region overlapping the electrode 41 when viewed from the z-direction. The second region 11A2 is a region overlapping the electrode 51 when viewed from the z-direction. The third region 11A3 is a region of the magnetic recording layer 11 other than the first region 11A1 and the second region 11A2. The third region 11A3 is, for example, sandwiched between the first region 11A1 and the second region 11A2 in the x-direction.

The magnetization $M_{A1}$ of the first region 11A1 is fixed by the electrode 41. The magnetization $M_{A2}$ of the second region 11A2 is fixed by the electrode 51. If the magnetization is fixed, it indicates that the magnetization is not reversed in a normal operation of the variable conductance element 101 (no external force beyond assumption is applied). The magnetization $M_{A1}$ of the first region 11A1 and the magnetization $M_{A2}$ of the second region 11A2 are, for example, oriented in opposite directions.

The third region 11A3 is a region where a direction of magnetization changes and the magnetic domain wall DW can move. The third region 11A3 is called a movable magnetic domain wall region. The third region 11A3 has a first magnetic domain MD1 and a second magnetic domain MD2. Magnetization orientation directions of the first magnetic domain MD1 and the second magnetic domain MD2 are opposite to each other. A boundary between the first magnetic domain MD1 and the second magnetic domain MD2 is the magnetic domain wall DW. Magnetization $M_{MD1}$ of the first magnetic domain MD1 is, for example, oriented in the same direction as the magnetization $M_{A1}$ of the first region 11A1. Magnetization $M_{MD2}$ of the second magnetic domain MD2 is, for example, oriented in the same direction as the magnetization $M_{A2}$ of the adjacent second region 11A2. In principle, the magnetic domain wall DW moves within the third region 11A3 and does not enter the first region 11A1 and the second region 11A2.

When a volume ratio between the first magnetic domain MD1 and the second magnetic domain MD2 changes, the magnetic domain wall DW moves. The magnetic domain wall DW is moved by, for example, applying a write current (for example, an electric current pulse) to the magnetic recording layer 11 in the x-direction, applying an external magnetic field to the magnetic recording layer 11, or the like. For example, when a write current is applied between the electrode 41 and the electrode 51, the magnetic domain wall DW moves.

The magnetic recording layer 11 includes a magnetic member. For example, the magnetic recording layer 11 can use a material similar to that of the reference layer 31. The magnetic recording layer 11 may be a ferromagnetic member, a ferrimagnetic member, or a combination of these and an antiferromagnetic member whose magnetic state can be changed with an electric current. Each of the magnetic recording layers 11 preferably has at least one element selected from the group consisting of Co, Ni, Fe, Pt, Pd, Gd, Tb, Mn, Ge, and Ga.

The magnetic recording layer 11 may be, for example, a laminated film of Co and Ni, a laminated film of Co and Pt, a laminated film of Co and Pd, a MnGa-based material, a GdCo-based material, a TbCo-based material, or the like. The ferrimagnetic member of the MnGa-based material, the GdCo-based material, the TbCo-based material, or the like have small saturation magnetization and a threshold current required to move the magnetic domain wall DW is small. Also, the laminated film of Co and Ni, the laminated film of Co and Pt, and the laminated film of Co and Pd have a large coercive force and a moving speed of the magnetic domain wall DW becomes slow. The antiferromagnetic member is, for example, $Mn_3X$ (X is Sn, Ge, Ga, Pt, Ir, or the like), $CuMnAs$, $Mn_2Au$, or the like.

The electrode 41 is in direct or indirect contact with a part of the magnetic recording layer 11. Indirect contact indicates that another layer is sandwiched between the electrode 41 and the magnetic recording layer 11. The electrode 41 comes into contact with, for example, a first end of the magnetic recording layer 11. The electrode 41 is electrically connected to the switching element SW1.

The electrode 41 is, for example, a ferromagnetic member. For the electrode 41, for example, materials similar to those of the magnetic recording layer 11 and the reference layer 31 can be applied. The electrode 41 may have an SAF structure. The magnetization $M_{41}$ of the electrode 41 fixes the magnetization $M_{A1}$ of the first region 11A1.

Also, the electrode 41 is not limited to a ferromagnetic member. An electric current density of an electric current flowing through the magnetic recording layer 11 sharply decreases at a position from the third region 11A3 to the first region 11A1. Because a movement range of the magnetic domain wall DW can be limited when the electric current density of the electric current flowing through the magnetic recording layer 11 is sharply lowered, the electrode 41 does not have to be a ferromagnetic member.

The electrode 51 is in direct or indirect contact with a part of the magnetic recording layer 11. The electrode 51 comes into contact with, for example, a second end of the magnetic recording layer 11. The electrodes 41 and 51 are spaced apart in the x-direction. The electrode 51 is electrically connected to the switching element SW3.

The electrode 51 is, for example, a ferromagnetic member. For example, a material similar to that of the electrode 41 can be applied to the electrode 51. The electrode 51 may have an SAF structure. The magnetization $M_{51}$ of the electrode 51 fixes the magnetization $M_{A2}$ of the second region 11A2. A film thickness of the electrode 51 may be different from a film thickness of the electrode 41. If the film thickness of the electrode 51 and the film thickness of the electrode 41 are different, there is a difference between the coercive force of the electrode 51 and the coercive force of the electrode 41, such that it is easy to fix the magnetization orientation in the opposite direction. The electrode 51 is not limited to a ferromagnetic member.

The electrode 61 is in contact with the reference layer 31. The electrode 61 is electrically connected to the switching element SW2. The electrode 61 is a conductor.

Figure 6:
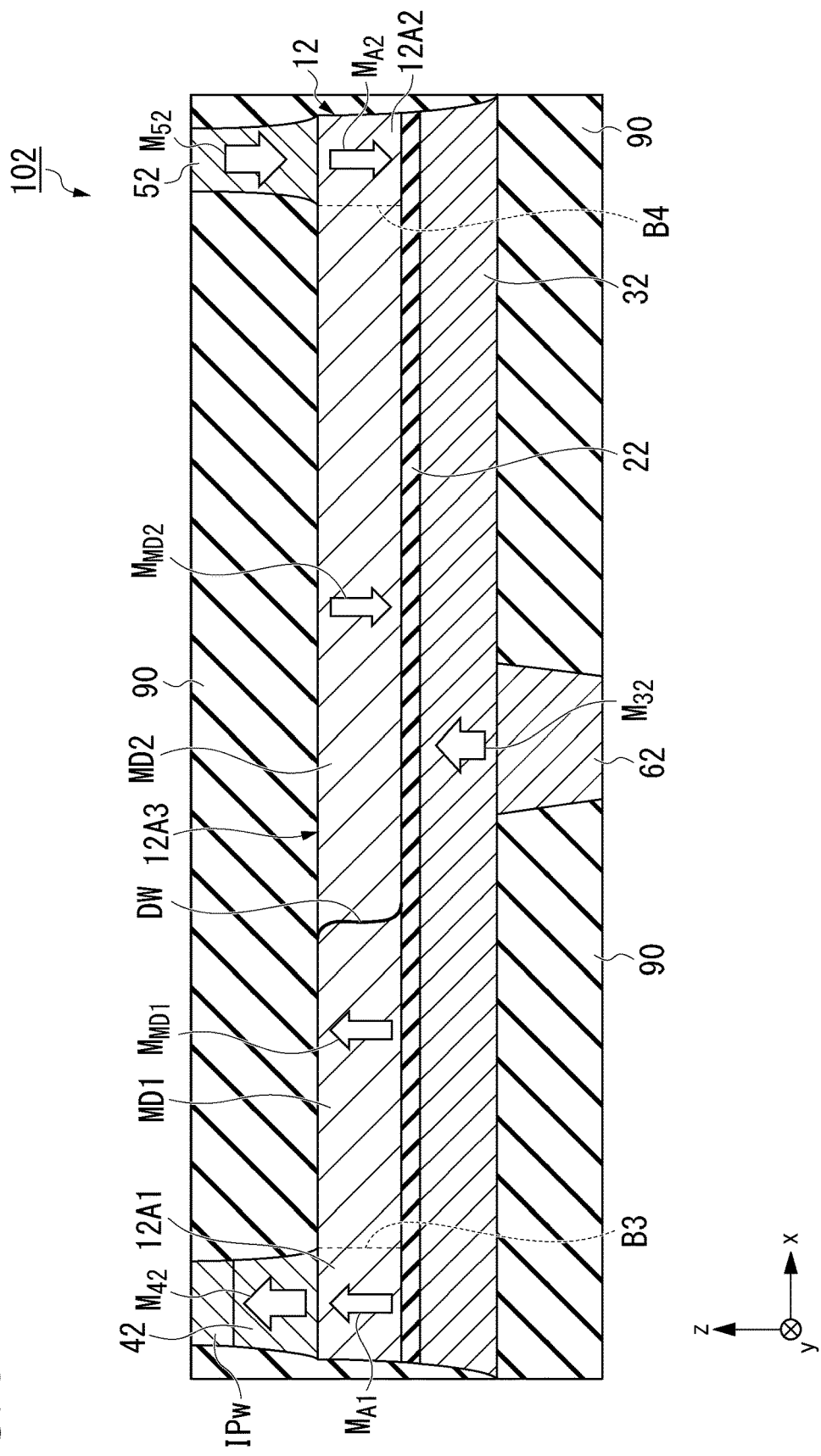
FIG. 6 is a cross-sectional view of a second variable conductance element according to the first embodiment.

FIG. 6 is a cross-sectional view of the variable conductance element 102. FIG. 6 is an xz cross-section passing through the center of the variable conductance element 102 in the y-direction and is a cross-section cut along a line B-B of FIG. 4.

The variable conductance element 102 includes a magnetic recording layer 12, a nonmagnetic layer 22, a reference layer 32, the electrode 42, the electrode 52, and an electrode 62. The variable conductance element 102 is a magnetic domain wall moving element and is also called a spin memristor. The variable conductance element 102 is similar to the variable conductance element 101, except that the lengths in the x- and y-directions are different. The magnetic recording layer 12 corresponds to the magnetic recording layer 11. The nonmagnetic layer 22 corresponds to the nonmagnetic layer 21. The reference layer 32 corresponds to the reference layer 31. The electrode 42 corresponds to the electrode 41. The electrode 52 corresponds to the electrode 51. The electrode 62 corresponds to the electrode 61. Description of a configuration of the variable conductance element 102 similar to that of the variable conductance element 101 is omitted.

The magnetic recording layer 12 has a first region 12A1, a second region 12A2, and a third region 12A3. The first region 12A1 corresponds to the first region 11A1.

The second region 12A2 corresponds to the second region 11A2. The third region 12A3 corresponds to the third region 11A3.

The direction of magnetization of each layer of the variable conductance element 101 and the variable conductance element 102 can be confirmed, for example, by measuring a magnetization curve. The magnetization curve can be measured using, for example, a Magneto Optical Kerr Effect (MOKE). Measurement based on MOKE is a measurement method in which linearly polarized light is allowed to be incident on a measurement target object and a magneto-optical effect (a magnetic Kerr effect) in which the rotation of the polarization direction thereof is caused is used.

The memristor 201 can be manufactured in a known method. The switching elements SW1, SW2, SW4, and SW5 can be manufactured using, for example, photolithography. A commercially available semiconductor substrate on which a plurality of transistors are formed may be used.

The variable conductance element 101 and the variable conductance element 102 are formed using a step of laminating each layer and a processing step of processing a part of each layer in a prescribed shape. A sputtering method, a chemical vapor deposition (CVD) method, an electron beam vapor deposition method (an EB vapor deposition method), an atomic laser deposition method, or the like can be used for laminating layers. Each layer can be processed using photolithography, etching (for example, Ar etching), and the like.

Next, an operation of writing a signal to the memristor 201 and an operation of reading a signal from the memristor 201 will be described.

The operation of writing a signal to the memristor 201 will be described. First, one of the memristors 201 to which a signal is to be written is selected. This selection is performed by, for example, the control unit 7. Subsequently, a write current is applied to each of the variable conductance element 101 and the variable conductance element 102 of the memristor 201 to which the signal is to be written. A write current (a write pulse) is applied to the variable conductance element 101 by turning on the switching elements SW1 and SW3 connected to the variable conductance element 101 of a write target. Also, a write current (a write pulse) is applied to the variable conductance element 102 by turning on the switching elements SW4 and SW6 connected to the variable conductance element 102 of a write target.

When a write current is applied to the magnetic recording layer 11, a position of the magnetic domain wall DW within the magnetic recording layer 11 changes. A position and a movement direction of the magnetic domain wall DW within the magnetic recording layer 11 can be controlled when the control unit 7 controls the potentials of the electrodes 41 and 51. Likewise, when a write current is applied to the magnetic recording layer 12, the position of the magnetic domain wall DW within the magnetic recording layer 12 changes. A position and a movement direction of the magnetic domain wall DW within the magnetic recording layer 12 can be controlled when the control unit 7 controls the potentials of the electrode 42 and the electrode 52.

When the position of the magnetic domain wall DW within the magnetic recording layer 11 changes, a resistance value of the variable conductance element 101 in the z-direction changes. When the position of the magnetic domain wall DW within the magnetic recording layer 12 changes, the resistance value of the variable conductance element 102 in the z-direction changes. The conductance is a reciprocal of the resistance value and the conductance of the variable conductance element 101 and the variable conductance element 102 in the z-direction also changes. Here, the conductance of the variable conductance element 101 in the z-direction is the conductance between the electrode 51 and the electrode 61 and the conductance of the variable conductance element 102 in the z-direction is the conductance between the electrode 52 and the electrode 62. The conductance corresponds to a written signal.

Figure 7:
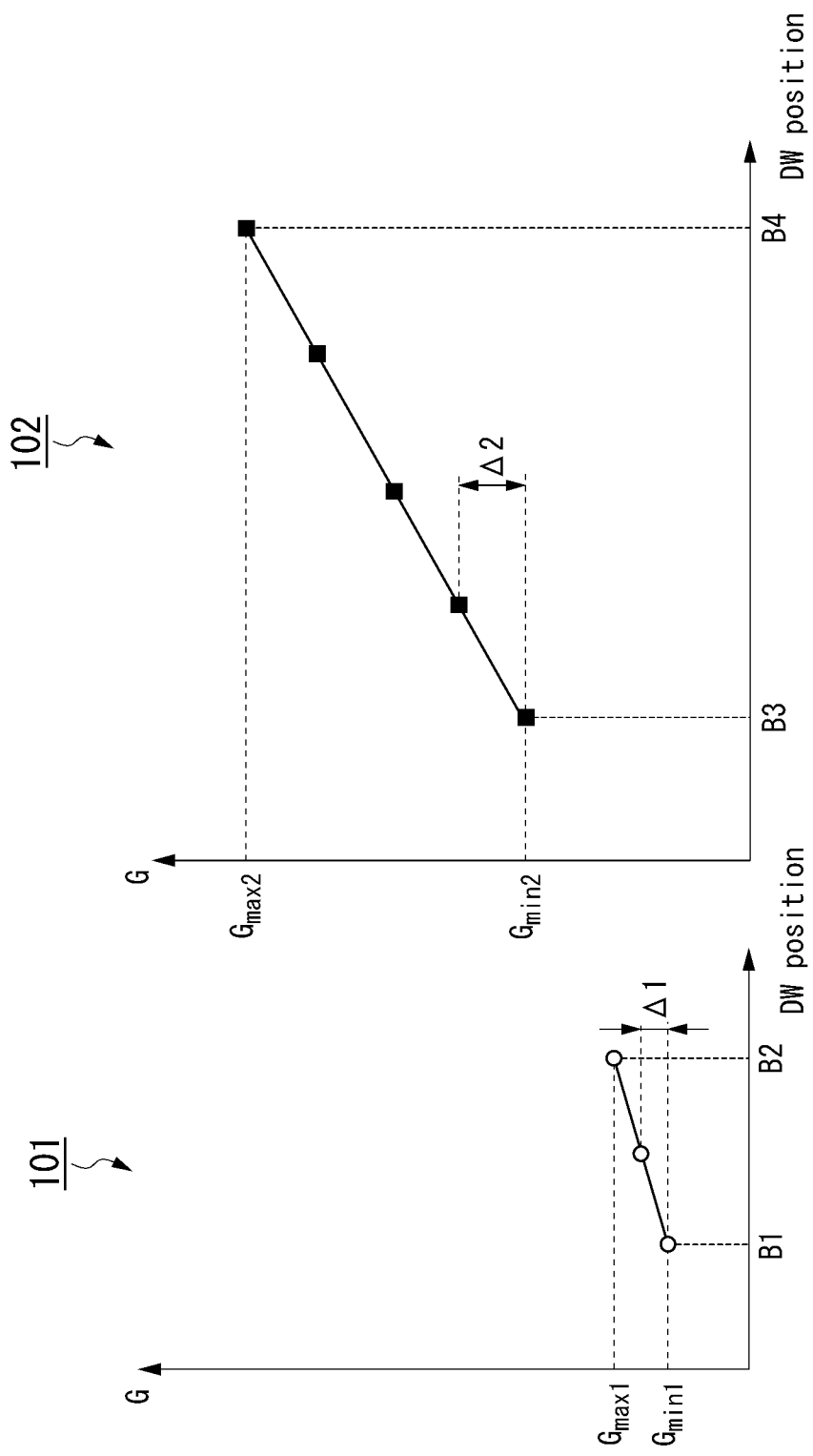
FIG. 7 is a diagram showing conductance changes in the first variable conductance element and the second variable conductance element according to the first embodiment.

FIG. 7 is a diagram showing conductance changes in the variable conductance element 101 and the variable conductance element 102. The conductance of the variable conductance element 101 shows a minimum value $G_{min1}$ when the magnetic domain wall DW is at a boundary B1 between the first region 11A1 and the third region 11A3 and shows a maximum value $G_{max1}$ when the magnetic domain wall DW is at a boundary B2 between the second region 11A2 and the third region 11A3. Likewise, the conductance of the variable conductance element 102 shows a minimum value $G_{min2}$ when the magnetic domain wall DW is at a boundary B3 between the first region 12A1 and the third region 12A3 and shows a maximum value $G_{max2}$ when the magnetic domain wall DW is at a boundary B4 between the second region 12A2 and the third region 12A3. Although the case where the conductance change for the position of the magnetic domain wall DW of the variable conductance element 101 and the variable conductance element 102 is linear is shown in FIG. 7 here, the conductance change does not have to be completely linear if the conductance change is monotonically increasing or monotonically decreasing.

For example, the minimum value $G_{min2}$ of the conductance of the variable conductance element 102 is larger than the maximum value $G_{max1}$ of the conductance of the variable conductance element 101. The maximum and minimum values of the conductance of the variable conductance elements 101 and 102 are freely designed by changing the material of each layer constituting the variable conductance elements 101 and 102, the length and width of the magnetic recording layer, and the thickness of the nonmagnetic layer.

The operation of reading a signal from the memristor 201 will be described. First, one of the plurality of memristors 201 from which a signal is to be read is selected. This selection is performed by, for example, the control unit 7. Subsequently, a read voltage is applied to each of the variable conductance element 101 and the variable conductance element 102 of the memristor 201 from which the signal is to be read. The read voltages applied to the variable conductance element 101 and the variable conductance element 102 are, for example, substantially the same. By turning on the switching elements SW2 and SW3 connected to the variable conductance element 101 of the read target, a read current flows through the variable conductance element 101 in the z-direction. By turning on the switching elements SW5 and SW6 connected to the variable conductance element 102 of the read target, a read current flows through the variable conductance element 102.

The conductance between the electrode 51 and the electrode 61 can be read when a read current flows through the variable conductance element 101. The conductance between the electrode 51 and the electrode 61 differs according to the position of the magnetic domain wall DW. Likewise, the conductance between the electrode 52 and the electrode 62 can be read when a read current flows through the variable conductance element 102. The conductance between the electrode 52 and the electrode 62 differs according to the position of the magnetic domain wall DW.

The variable conductance element 101 and the variable conductance element 102 are connected to the same third wiring RL. That is, a first read path for reading the conductance of the variable conductance element 101 merges with a second read path for reading the conductance of the variable conductance element 102 in the third wiring RL. The first read path and the second read path are connected in parallel to form an electrically parallel circuit. The read current flowing through the variable conductance element 101 and the read current flowing through the variable conductance element 102 overlap in the third wiring RL. As a result, the conductance of the variable conductance element 101 and the conductance of the variable conductance element 102 are added up together.

A result of adding up the conductance of the variable conductance element 101 and the conductance of the variable conductance element 102 is read as a signal from the memristor 201.

Because the memristor 201 adds up the conductance of a plurality of variable conductance elements, a maximum change range of the conductance is wide and a change range for a gradation is narrow. A memristor with a wide maximum change range of conductance and a narrow change range for a gradation enables many gradations to be set.

The term "gradation" in the present specification indicates a stage of conductance from a high conductance state to a low conductance state. A state in which the conductance value is within a certain range is a gradation. If the conductance change range for a gradation is extremely narrow, erroneous writing and erroneous reading are caused, such that there is a lower limit in the conductance change range for a gradation. The conductance change range for a gradation can be arbitrarily set according to the measurement accuracy of a measurement system.

The conductance change range for a gradation is set for each of the variable conductance elements 101 and 102. For example, the conductance change range that changes with a write pulse may be set as the conductance change range for a gradation.

In the example shown in FIG. 7, the variable conductance element 101 has three gradations and the variable conductance element 102 has five gradations. For example, in the variable conductance element 101, the conductance has a first gradation from the minimum value $G_{min1}$ to half a sum of the minimum value $G_{min1}$ and the intermediate value, a second gradation from half the sum of the minimum value $G_{min1}$ and the intermediate value to half a sum of the maximum value $G_{max1}$ and the intermediate value, and a third gradation from half the sum of the maximum value $G_{max1}$ and the intermediate value to the maximum value $G_{max1}$. Likewise, even in the variable conductance element 102, first to fifth gradations can be set.

Figure 8:
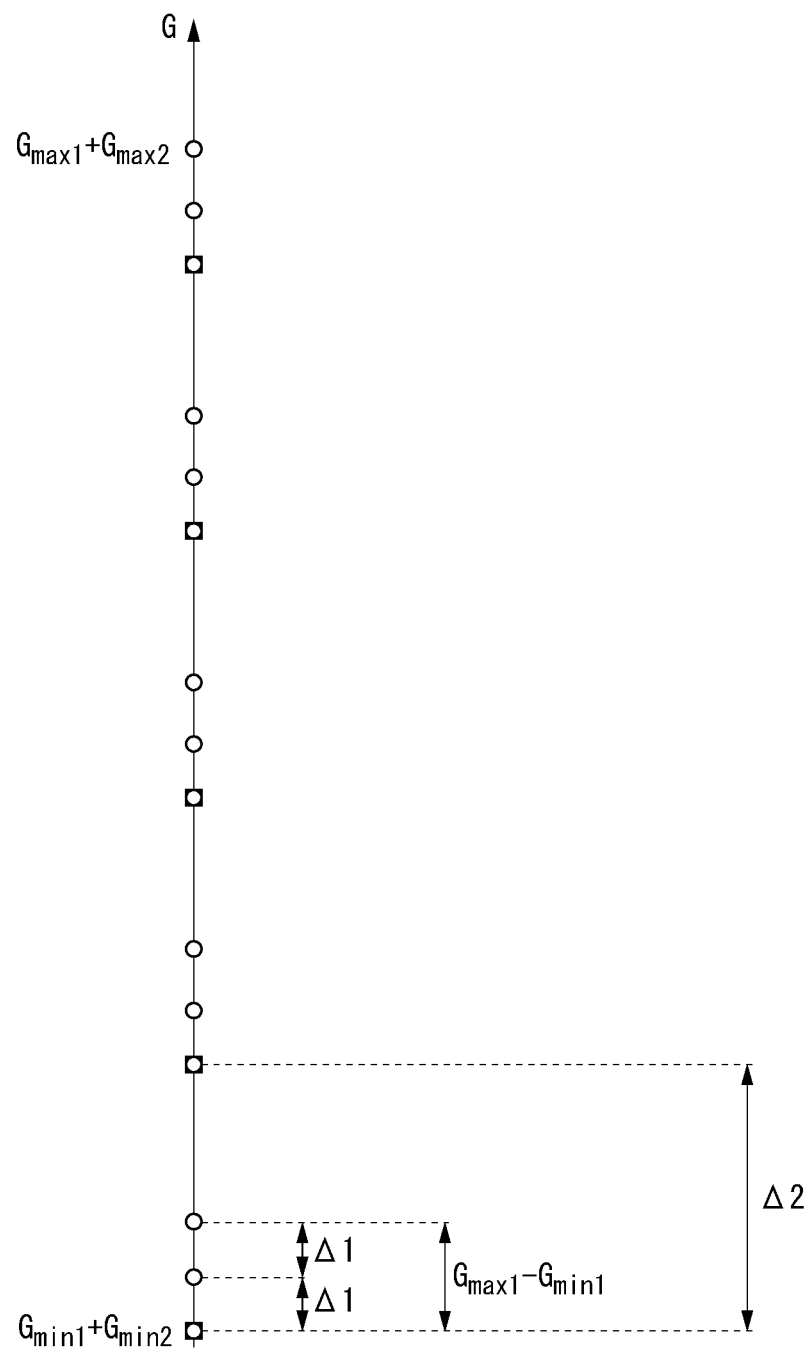
FIG. 8 is a diagram showing a conductance change in the memristor according to the first embodiment.

FIG. 8 shows a conductance change in the memristor 201. As described above, the conductance of the memristor 201 is a sum of the conductance of the variable conductance element 101 and the conductance of the variable conductance element 102. For example, the memristor 201 shown in FIG. 8 can indicate 3×5=15 gradations by adding up the conductance of the variable conductance element 101 having the three gradations and the conductance of the variable conductance element 102 having the five gradations.

In general, if the number of gradations in the memristor increases, the size of the memristor increases. This is because there is a lower limit in a conductance range for a gradation and the memristor has a larger maximum conductance change range when the number of gradations is larger. For example, in the case of a magnetic domain wall moving element using a magnetic domain wall, the length of the element is longer in one direction (for example, the x-direction) when the number of gradations is larger.

Also, as the size of the memristor increases, the maximum voltage required for writing also increases. In order to control a large write voltage, a transistor with a large maximum rated current value is required and a size of the transistor connected to the memristor also increases.

On the other hand, the memristor 201 according to the present embodiment can represent many gradations by combining a plurality of variable conductance elements 101 and 102. When the plurality of variable conductance elements 101 and 102 are used, a degree of freedom in the arrangement is higher than that when there is a single element and many memristors 201 can be arranged within a limited area.

Also, because a separate write operation is performed for the variable conductance element 101 and the variable conductance element 102, a write voltage is less likely to become excessive. Thus, the size of the transistor can be reduced and many memristors 201 can be arranged in a limited area.

Also, the memristor 201 according to the present embodiment performs the write operations associated with the variable conductance element 101 and the variable conductance element 102 separately, such that a required gradation change can be made with a small number of write pulses. For example, when 15 gradations are changed in one memristor, it is necessary to apply a write pulse at least 14 times. On the other hand, in the case of the memristor 201 according to the present embodiment, it is possible to change 15 gradations in a total of six write pulse application operations including two write pulse application operations for the variable conductance element 101 and four write pulse application operations for the variable conductance element 102.

The conductance change range and the number of gradations of the memristor 201 are determined on the basis of the conductance change range and the number of gradations of each of the variable conductance element 101 and the variable conductance element 102.

The conductance change ranges and the number of gradations of the variable conductance element 101 and the variable conductance element 102 can be set arbitrarily.

For example, the minimum value $G_{min2}$ of conductance of the variable conductance element 102 during reading is made larger than the maximum value $G_{max1}$ of conductance of the variable conductance element 101 during reading. When a conductance relationship between the variable conductance element 101 and the variable conductance element 102 is set as described above, ranges (hereinafter referred to as conductance ranges) in which the conductance of the variable conductance element 101 and the variable conductance element 102 changes do not overlap.

Also, as shown in FIG. 8, a conductance change range Δ2 for a gradation of the variable conductance element 102 may be larger than a conductance change range 41 for a gradation of the variable conductance element 101. Here, the conductance change range for a gradation is a range of a change in conductance that changes in one write operation. For example, the conductance change range for a gradation is a range of a change in conductance that changes when one write pulse application operation is performed.

If a conductance relationship between the variable conductance element 101 and the variable conductance element 102 is set as described above, the controllability of the memristor 201 is improved. For example, proper use in which the variable conductance element 102 can be changed when the conductance is significantly changed and the variable conductance element 101 can be changed when the conductance is finely adjusted is possible.

The conductance change range Δ2 for a gradation of the variable conductance element 102 may be larger than a maximum change range $G_{max1}$-$G_{min1}$ of the conductance of the variable conductance element 101. The maximum change range of the conductance of the variable conductance element 101 is a difference between the maximum value $G_{max1}$ and the minimum value $G_{min1}$ of the conductance of the variable conductance element 101.

If the relationship between the conductance of the variable conductance element 101 and the conductance of the variable conductance element 102 satisfies this relationship, there is no overlapping of values after the conductance of the variable conductance element 101 and the conductance of the variable conductance element 102 are added up. That is, when the conductance of the memristor 201 is set to a desired value, one combination of gradations of the variable conductance element 101 and the variable conductance element 102 is decided on.

Also, the conductance change range Δ2 for a gradation of the variable conductance element 102 may be larger than a maximum change range $G_{max1}$-$G_{min1}$ of conductance of the variable conductance element 101 and may be less than or equal to a sum of the maximum change range $G_{max1}$-$G_{min1}$ of the conductance of the variable conductance element 101 and the conductance change range 41 for a gradation of the variable conductance element 101. If the conductance relationship between the variable conductance element 101 and the variable conductance element 102 is set as described above, the conductance change range per gradation after the conductance of the variable conductance element 101 and the conductance of the variable conductance element 102 are added up becomes substantially uniform. That is, the linearity of the conductance change of the memristor 201 is improved.

Also, the number of gradations of the variable conductance element 102 may be greater or less than the number of gradations of the variable conductance element 101. An influence of the variable conductance element 102 having large conductance on a conductance change in the memristor 201 is greater than an influence of the variable conductance element 101 on the conductance change in the memristor 201. In the former case, it is possible to reduce an influence of a write error on the conductance change in the memristor 201 when the write error occurs in the variable conductance element 102 by increasing the number of gradations of the variable conductance element 102 having the large conductance. In the latter case, it is possible to reduce the number of write operations for the variable conductance element 102 with a high write voltage by reducing the number of gradations of the variable conductance element 102. A path along which a write current flows in relation to the variable conductance element 102 is longer than a path along which a write current flows in relation to the variable conductance element 101 and a write voltage required in relation to the variable conductance element 102 is higher than a write voltage required in relation to the variable conductance element 101.

The memristor device 1 according to the present embodiment can be used, for example, in a neuromorphic device. The neuromorphic device has, for example, a memristor array 2 including a plurality of memristors 201 and a control device 3 for controlling the memristor array 2.

The neuromorphic device is a device that artificially emulates the relationship between neurons and synapses in the human brain. The neuromorphic device can perform calculations in a neural network.

Figure 9:
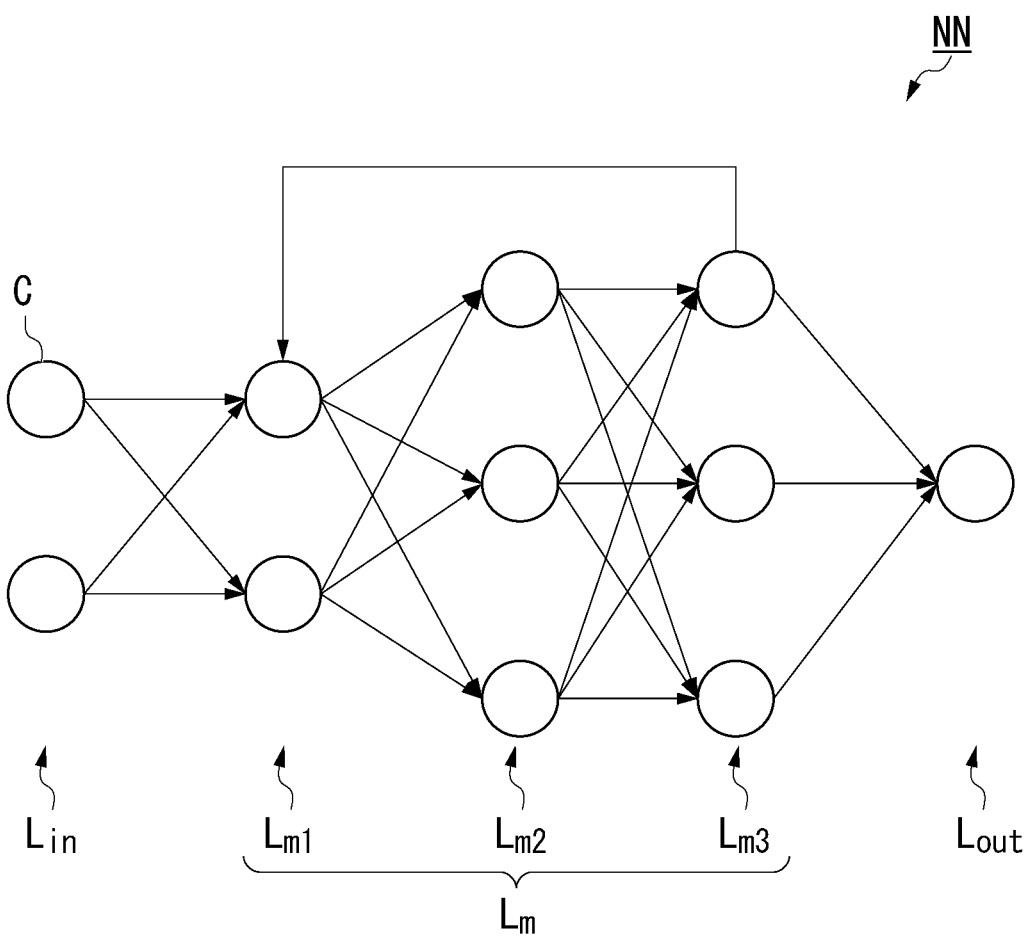
FIG. 9 is a schematic diagram of a neural network.

FIG. 9 is a schematic diagram of a neural network NN. The neural network NN has an input layer $L_{in}$, an intermediate layer $L_m$, and an output layer $L_{out}$. Although an example in which there are three intermediate layers $L_m$ is shown in FIG. 9, the number of intermediate layers $L_m$ does not matter. Each of the input layer $L_{in}$, the intermediate layer $L_{in}$, and the output layer $L_{out}$ has a plurality of chips C, each chip C corresponding to a neuron in the brain. The input layer $L_{in}$, the intermediate layer $L_m$, and the output layer $L_{out}$ are connected by a transfer means. The transfer means corresponds to synapses in the brain. The number of chips C and the transfer means shown in FIG. 9 is an example.

The neural network NN increases a rate of correct answers to questions by learning the transfer means (synapses). Learning is to find knowledge that can be used in the future from information. The neural network NN performs a learning process by operating while changing a weight of the transfer means. The transfer means performs a product operation for weighting input signals and a sum operation for adding up product operation results. That is, the transfer means performs a product-sum operation.

In the memristor 201, the conductance changes with positions of the magnetic domain walls DW of the variable conductance elements 101 and 102. The conductance of the memristor 201 corresponds to a weight of the transfer means. Because the memristor 201 outputs the product of the input voltage and its own conductance value as a signal, it functions as a product calculation element. Because the memristor array 2 combines outputs from the plurality of memristors 201, it functions as a product-sum operator. The product-sum operation associated with the plurality of memristors 201 is controlled by the control device 3.

The learning of the neural network NN has an initial learning step (hereinafter referred to as a first step) and a late learning step (hereinafter referred to as a second step) for performing more detailed learning. Rough learning is performed in the first step and detailed learning is performed in the second step.

When the memristor device 1 according to the present embodiment is applied to the neural network NN, at least the conductance of the variable conductance element 102 is changed, for example, in the first step of learning. In the first step of learning, only the conductance of the variable conductance element 102 may be changed. In the first step of learning, because the weight is changed significantly, learning can be performed efficiently by changing the conductance of the variable conductance element 102 having high conductance.

Also, when the memristor device 1 according to the present embodiment is applied to the neural network NN, at least the conductance of the variable conductance element 101 is changed, for example, in the second step of learning. In the second step of learning, only the conductance of the variable conductance element 101 may be changed. In the second step of learning, fine weight adjustment is performed. Thus, learning can be performed efficiently by changing the conductance of the variable conductance element 101 having low conductance.

Also, a result of performing a pre-learning process in an external portion may be given to the variable conductance element 102 and only the conductance of the variable conductance element 101 may be changed in an edge device. Thereby, it is also possible to reduce the calculation load on the edge device.

Second Embodiment

Figure 10:
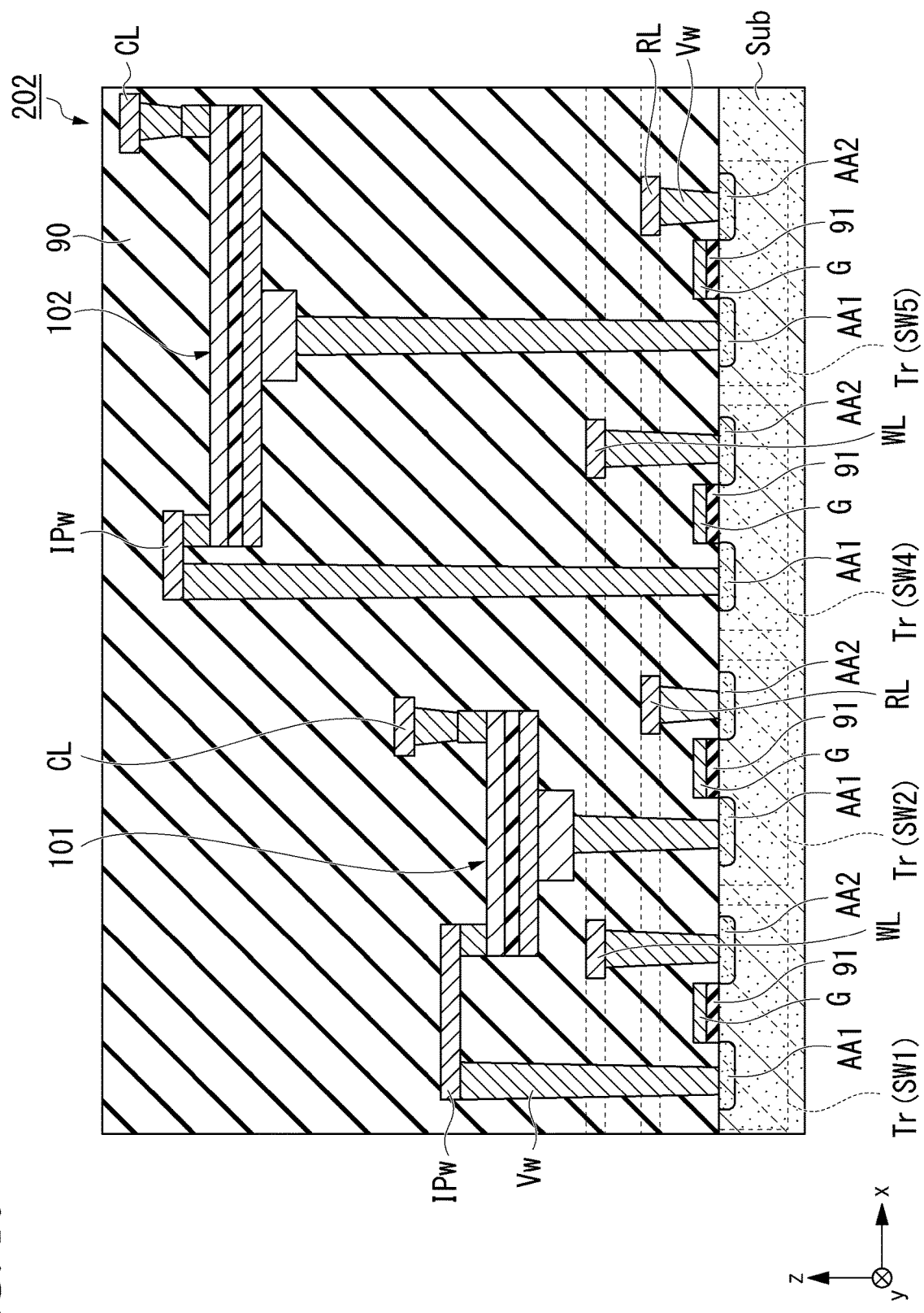
FIG. 10 is a cross-sectional view of a memristor according to a second embodiment.

FIG. 10 is a cross-sectional view of a memristor 202 according to a second embodiment. FIG. 10 is a cross-section cut along an xz-plane passing through the center of the memristor 202 in the y-direction. In the memristor 202 according to the second embodiment, components similar to those in the memristor 201 according to the first embodiment are denoted by the same reference signs and description thereof is omitted.

In the memristor 202 according to the second embodiment, a variable conductance element 101 and a variable conductance element 102 are at different height positions in the z-direction. The variable conductance element 101 and the variable conductance element 102 are in different layers. The variable conductance element 101 and the variable conductance element 102 have different conductance ranges and often have different sizes. The variable conductance element 101 and the variable conductance element 102 having different sizes are arranged in different layers, such that the variable conductance element 101 and the variable conductance element 102 can be arranged more efficiently within a limited area.

Also, the variable conductance element 101 and the variable conductance element 102 are arranged in different layers, such that the variable conductance element 101 and the variable conductance element 102 can be easily manufactured separately. The variable conductance element 101 and the variable conductance element 102 are manufactured separately, such that the design (for example, the material of the nonmagnetic layer, the shape of the magnetic domain wall moving layer, or the like) according to the conductance range required for each of the variable conductance elements 101 and 102 is facilitated.

Third Embodiment

Figure 11:
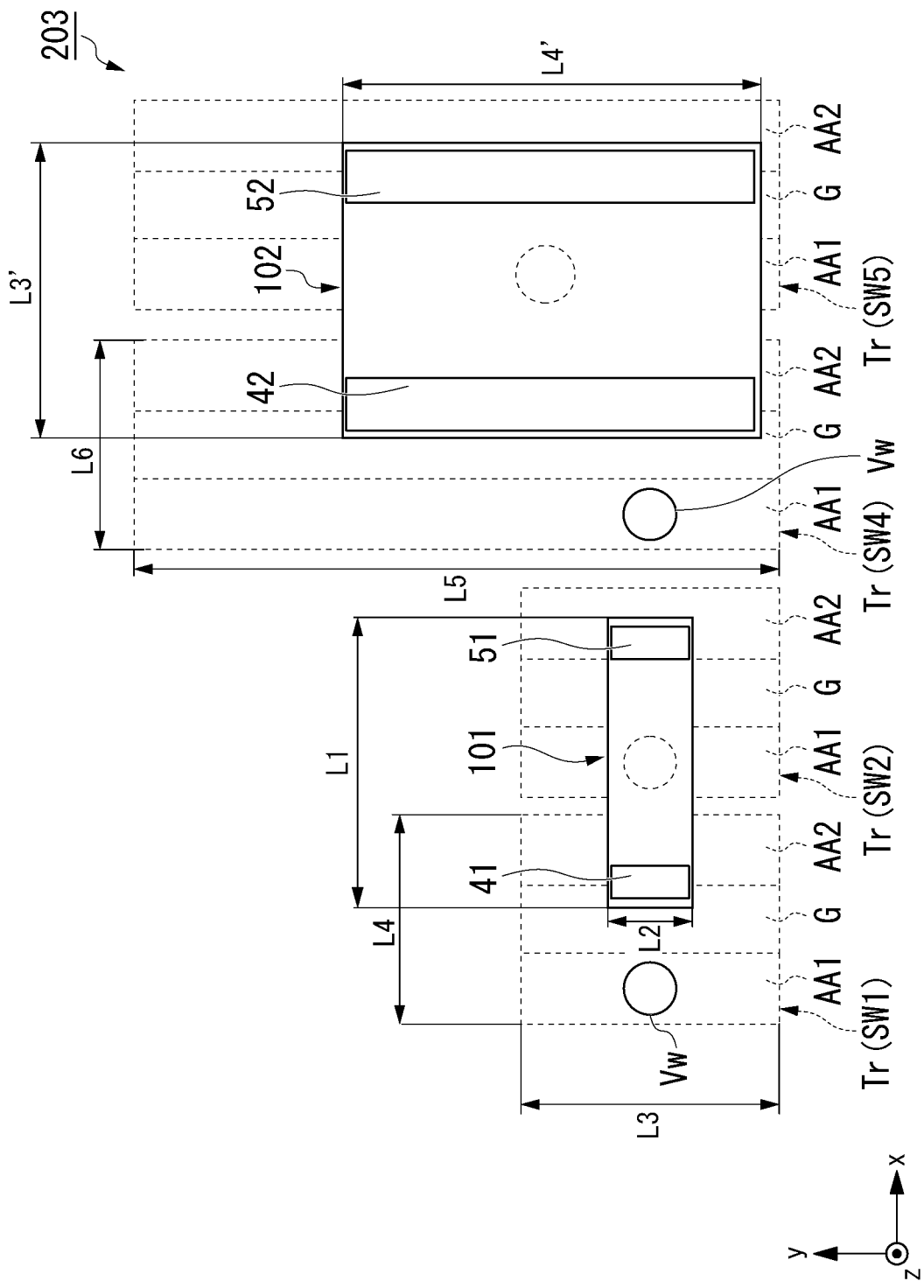
FIG. 11 is a plan view of a memristor according to a third embodiment.

FIG. 11 is a plan view of a memristor 203 according to a third embodiment. In the memristor 203 according to the third embodiment, components similar to those in the memristor 201 according to the first embodiment are denoted by the same reference signs and description thereof is omitted.

The memristor 203 according to the third embodiment is different from the memristor 201 according to the first embodiment in an x-direction length L3' and a y-direction length L4' of a variable conductance element 102.

The variable conductance element 101 has, for example, a rectangular shape in which an x-direction length L1 is longer than a y-direction length L2 when viewed from above in the z-direction. The variable conductance element 102 has, for example, a rectangular shape in which the y-direction length L4' is longer than the x-direction length L3' when viewed from above in the z-direction. For example, the length L1 of the variable conductance element 101 is substantially the same as the length L3' of the variable conductance element 102. For example, the length L2 of the variable conductance element 101 is shorter than the length L4' of the variable conductance element 102. The length L4' of the variable conductance element 102 shown in FIG. 11 is longer than the length L4 of the variable conductance element 102 shown in FIG. 4.

In the memristor 203 according to the third embodiment, the conductance ranges of the variable conductance elements 101 and 102 are different because the length L2 of the variable conductance element 101 and the length L4' of the variable conductance element 102 are different. In the memristor 203 according to the third embodiment, a difference between the x-direction length L3' of the variable conductance element 102 and the x-direction length L1 of the variable conductance element 101 is small and the variable conductance element 102 has a small aspect ratio. Thus, the memristor 203 can have the variable conductance element 101 and the variable conductance element 102 efficiently arranged within a prescribed area and is excellent in integration. Also, if the length of the variable conductance element 102 in the x-direction is short, a voltage required to write a signal to the variable conductance element 102 can be reduced.

Also, a method of changing the conductance ranges of the variable conductance element 101 and the variable conductance element 102 is not limited to a method of changing the lengths of the variable conductance element 101 and the variable conductance element 102 in the x-direction and a method of changing the lengths of the variable conductance element 101 and the variable conductance element 102 in the y-direction.

For example, a difference between the resistivity of the variable conductance element 101 and the resistivity of the variable conductance element 102 is given, such that the conductance ranges of the variable conductance element 101 and the variable conductance element 102 may be changed. The resistivities of the variable conductance element 101 and the variable conductance element 102 can be changed, for example, by changing the materials and thicknesses of the nonmagnetic layers 21 and 22. For example, the resistivity of the variable conductance element 101 in a state in which the conductance of the variable conductance element 101 is lowest may be made higher than the resistivity of the variable conductance element 102 in a state in which the conductance of the variable conductance element 102 is lowest. When the resistivity of the variable conductance element 101 and the resistivity of the variable conductance element 102 are changed, the sizes of the variable conductance element 101 and the variable conductance element 102 can be made substantially the same and the variable conductance element 101 and the variable conductance element 102 can be easily arranged within a prescribed area more efficiently.

Fourth Embodiment

Figure 12:
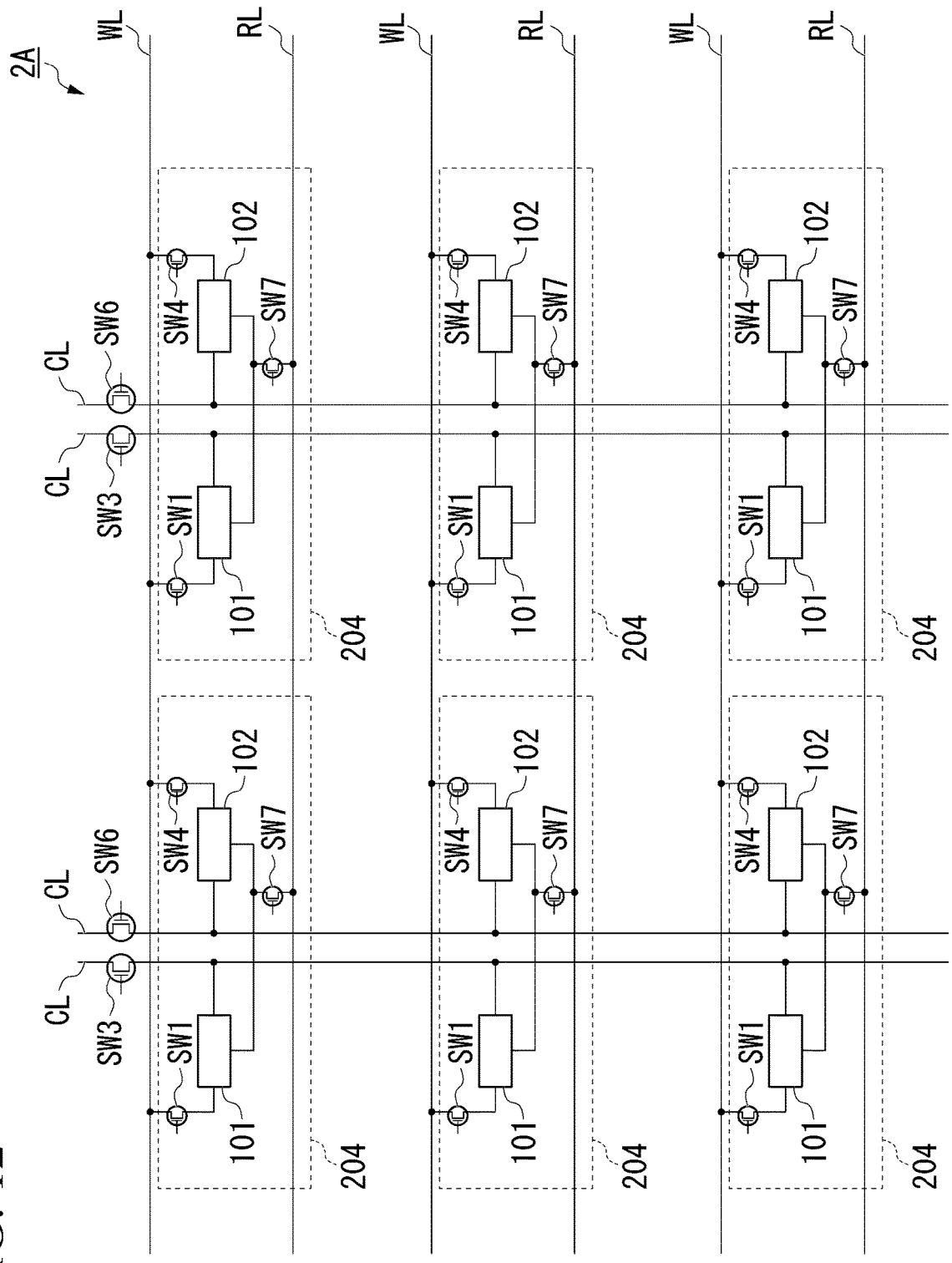
FIG. 12 is a circuit diagram of a memristor array according to a fourth embodiment.
Figure 13:
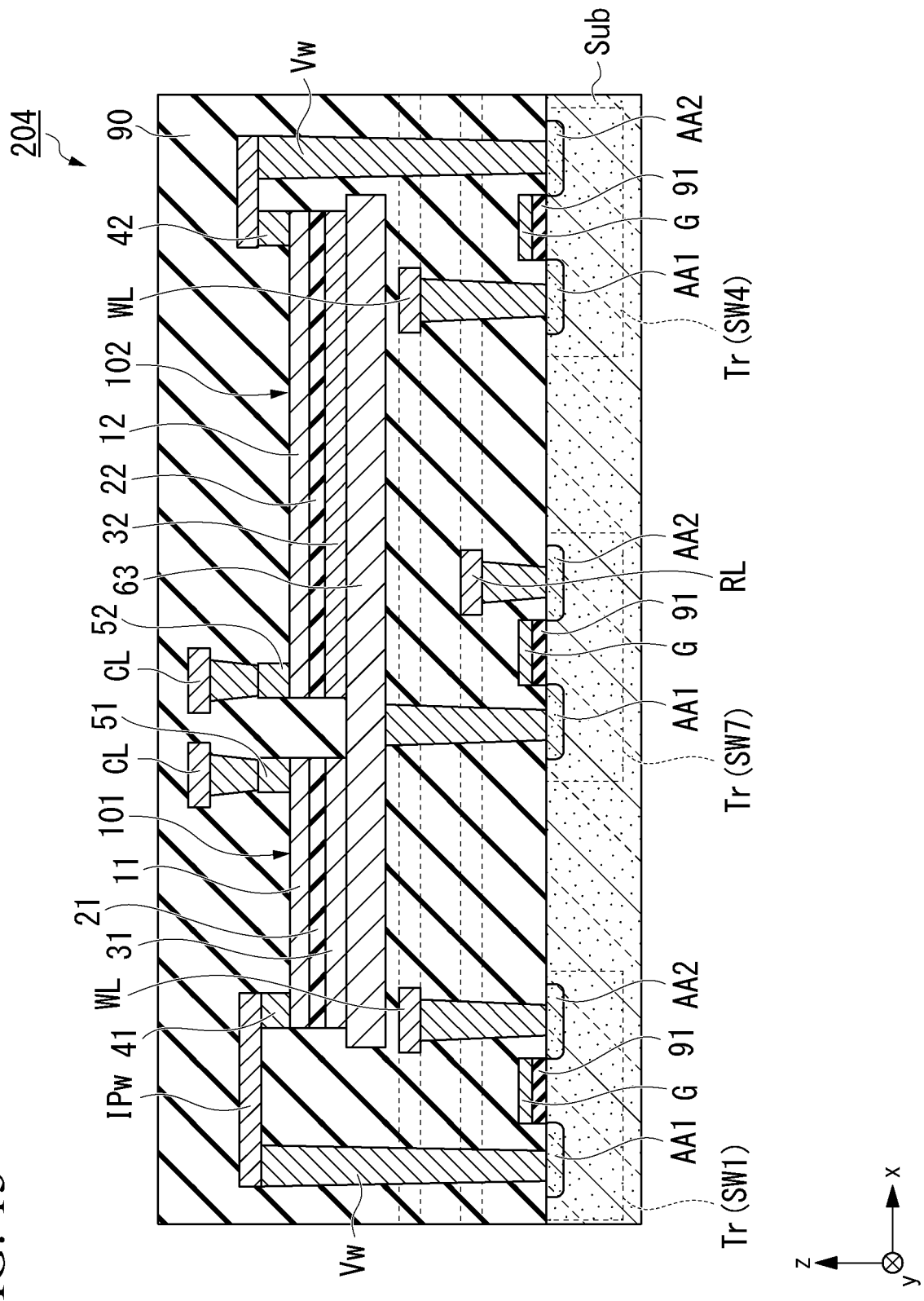
FIG. 13 is a cross-sectional view of a memristor according to the fourth embodiment.

FIG. 12 is a circuit diagram of a memristor array 2A according to a fourth embodiment. FIG. 13 is a cross-sectional view of a memristor 204 according to the fourth embodiment. FIG. 13 is a cross-section cut along an xz-plane passing through the center of the memristor 204 in the y-direction. In the memristor 204 according to the fourth embodiment, components similar to those in the memristor 201 according to the first embodiment are denoted by the same reference signs and description thereof is omitted.

In the memristor 204, a variable conductance element 101 and a variable conductance element 102 share a read electrode 63. The electrode 63 also functions as the electrode 61 and the electrode 62 according to the first embodiment. The electrode 63 is an example of a shared read electrode. A material similar to that of the electrode 61 is used for the electrode 63. Because the variable conductance element 101 and the variable conductance element 102 share the electrode 63, the variable conductance element 101 and the variable conductance element 102 are thermally connected and the variation in characteristics due to a temperature difference between the variable conductance element 101 and the variable conductance element 102 is reduced.

The electrode 63 is connected to a switching element SW7. The switching element SW7 is turned on during a read operation associated with the variable conductance element 101 and the variable conductance element 102. The switching element SW7 also functions as the switching element SW2 and the switching element SW5 according to the first embodiment. The number of switching elements arranged in the memristor array 2A is smaller than the number of switching elements arranged in the memristor array 2 according to the first embodiment. That is, the memristor 204 can be highly integrated within a limited area.

Fifth Embodiment

Figure 14:
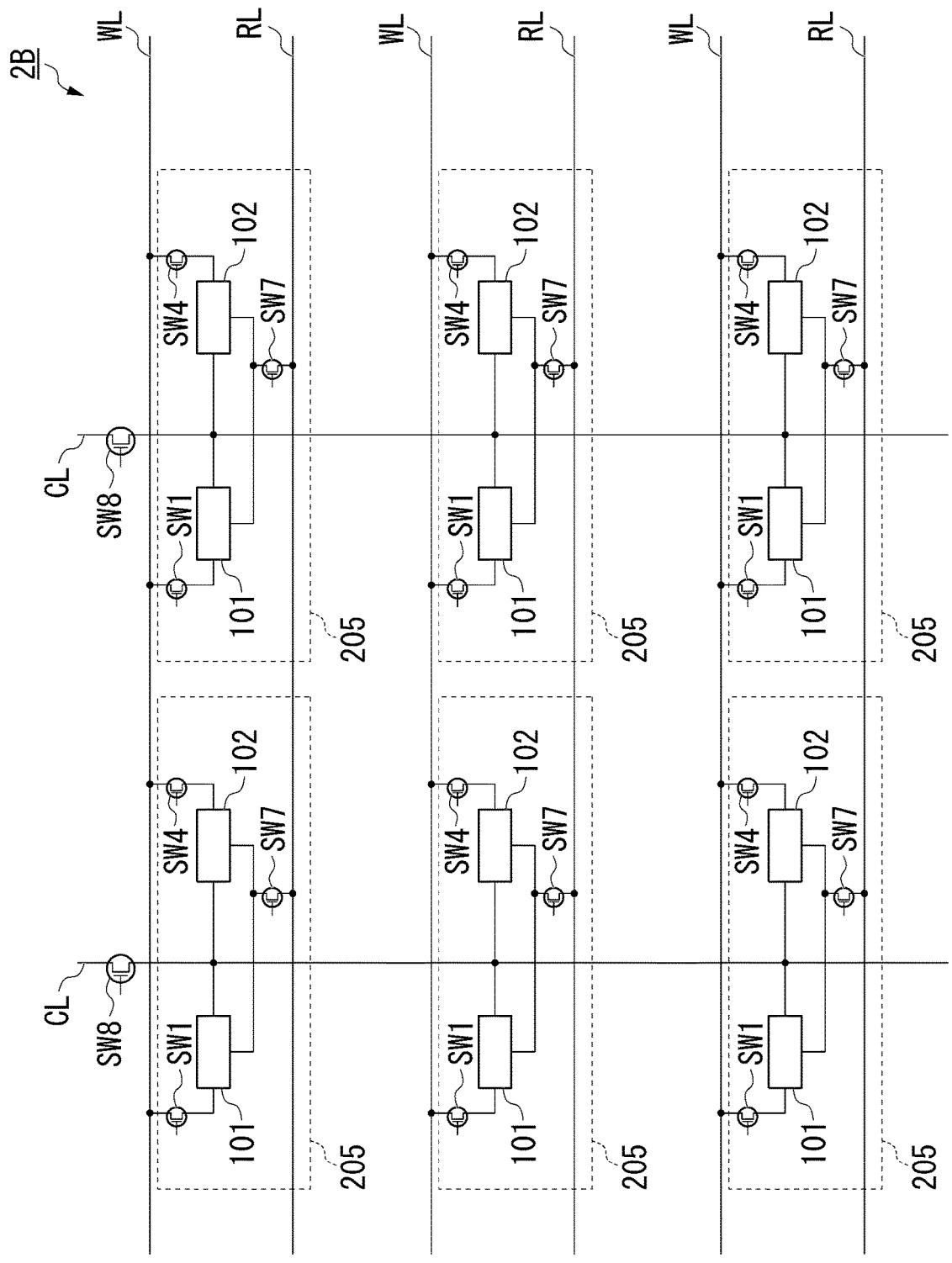
FIG. 14 is a circuit diagram of a memristor array according to a fifth embodiment.
Figure 15:
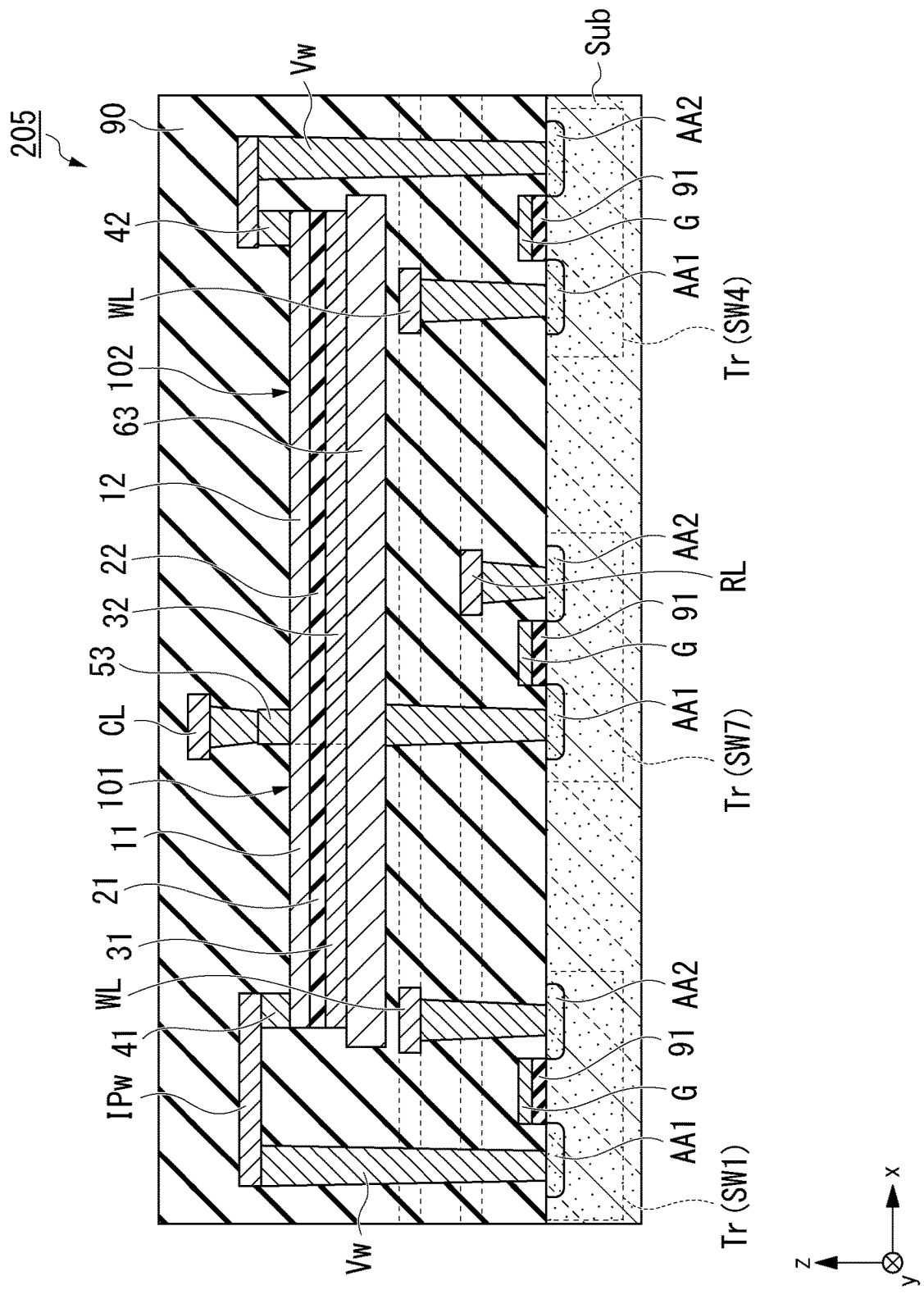
FIG. 15 is a cross-sectional view of a memristor according to the fifth embodiment.
Figure 16:
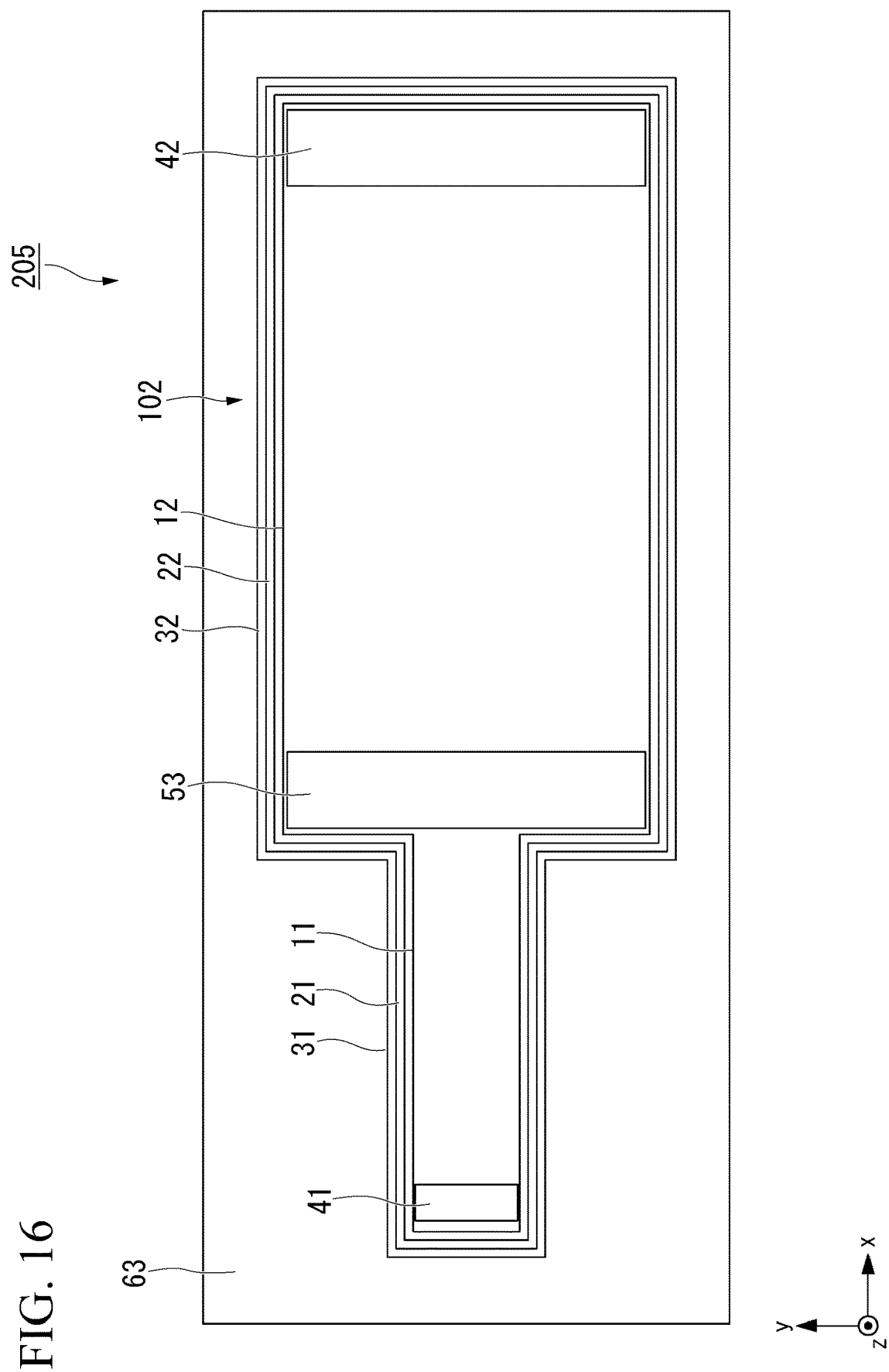
FIG. 16 is a plan view of the memristor according to the fifth embodiment.

FIG. 14 is a circuit diagram of a memristor array 2B according to a fifth embodiment. FIG. 15 is a cross-sectional view of a memristor 205 according to the fifth embodiment. FIG. 15 is a cross-section cut along an xz-plane passing through the center of the memristor 205 in the y-direction. FIG. 16 is a plan view of the memristor 205 according to the fifth embodiment. In the memristor 205 according to the fifth embodiment, components similar to those in the memristor 201 according to the first embodiment are denoted by the same reference signs and description thereof is omitted.

In the memristor 205, a variable conductance element 101 and a variable conductance element 102 share an electrode 63 for reading. The electrode 63 also functions as the electrode 61 and the electrode 62 according to the first embodiment. In the memristor 205, the variable conductance element 101 and the variable conductance element 102 share an electrode 53 for use in writing and reading. The electrode 53 also functions as the electrode 51 and the electrode 52 according to the first embodiment. The electrode 53 is formed by integrating the electrode 51 and the electrode 52 according to the first embodiment.

In the memristor 205, the magnetic recording layer 11 and the magnetic recording layer 12 according to the first embodiment are connected and integrated. In the memristor 205, the nonmagnetic layer 21 and the nonmagnetic layer 22 according to the first embodiment are connected and integrated. In the memristor 205, the reference layers 31 and 32 according to the first embodiment are connected and integrated. The memristor 205 has fewer components than the memristor 201 and is easily highly integrated.

The electrode 53 is connected to a switching element SW8. The switching element SW8 also functions as the switching element SW3 and the switching element SW6 according to the first embodiment.

The electrode 63 is connected to a switching element SW7. The switching element SW7 is turned on during a read operation associated with the variable conductance element 101 and the variable conductance element 102. The switching element SW7 also functions as the switching element SW2 and the switching element SW5 according to the first embodiment. The memristor array 2B has fewer switching elements than the memristor array 2 according to the first embodiment. That is, the memristor 205 can be highly integrated within a limited area.

Figure 17:
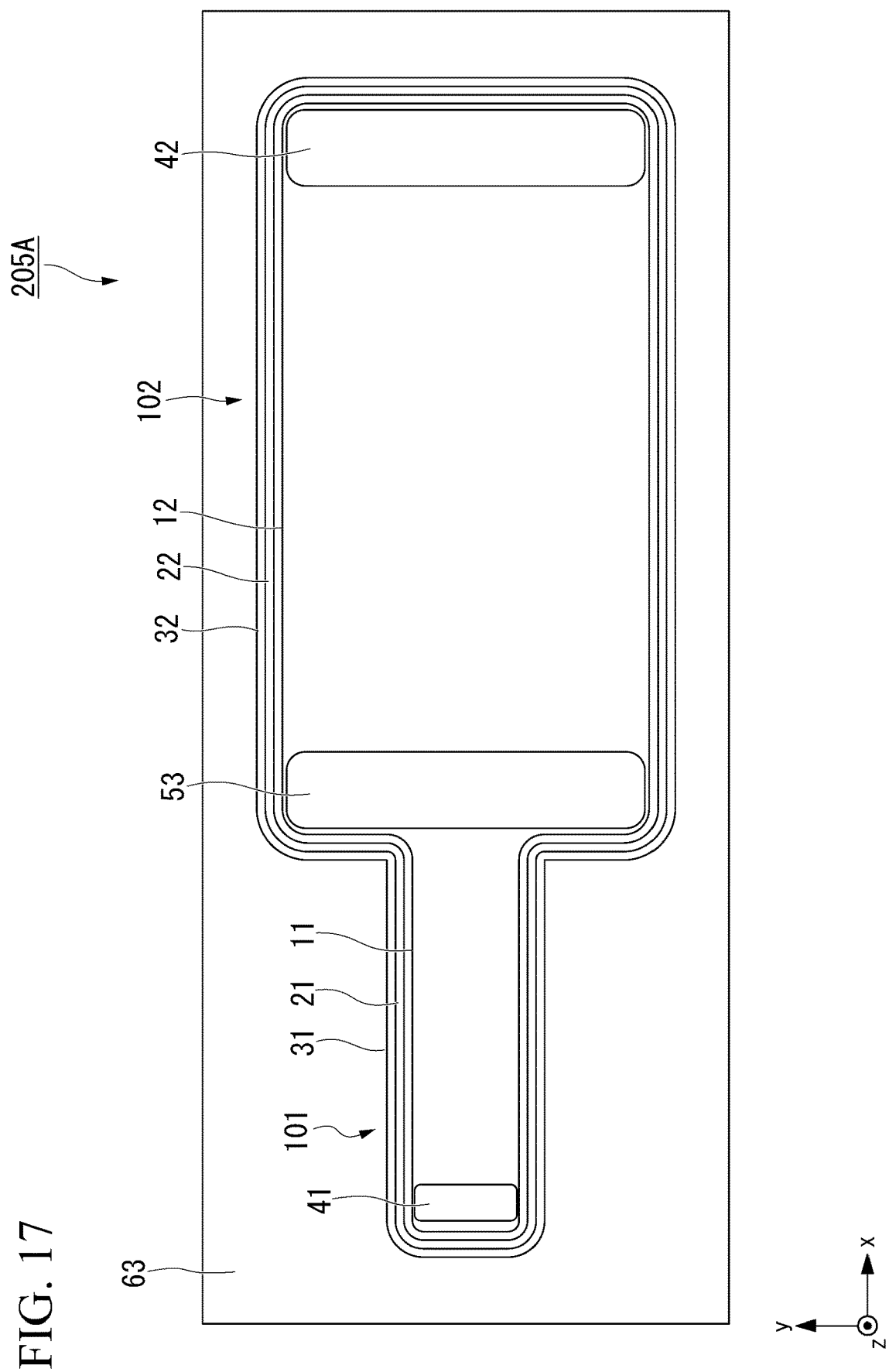
FIG. 17 is a plan view of a memristor according to a modified example of the fifth embodiment.

FIG. 17 is a plan view of a modified example of the memristor 205 according to the fifth embodiment. As in a memristor 205A shown in FIG. 17, the ends of the variable conductance element 101 and the variable conductance element 102 may be curved instead of being bent.

Sixth Embodiment

Figure 18:
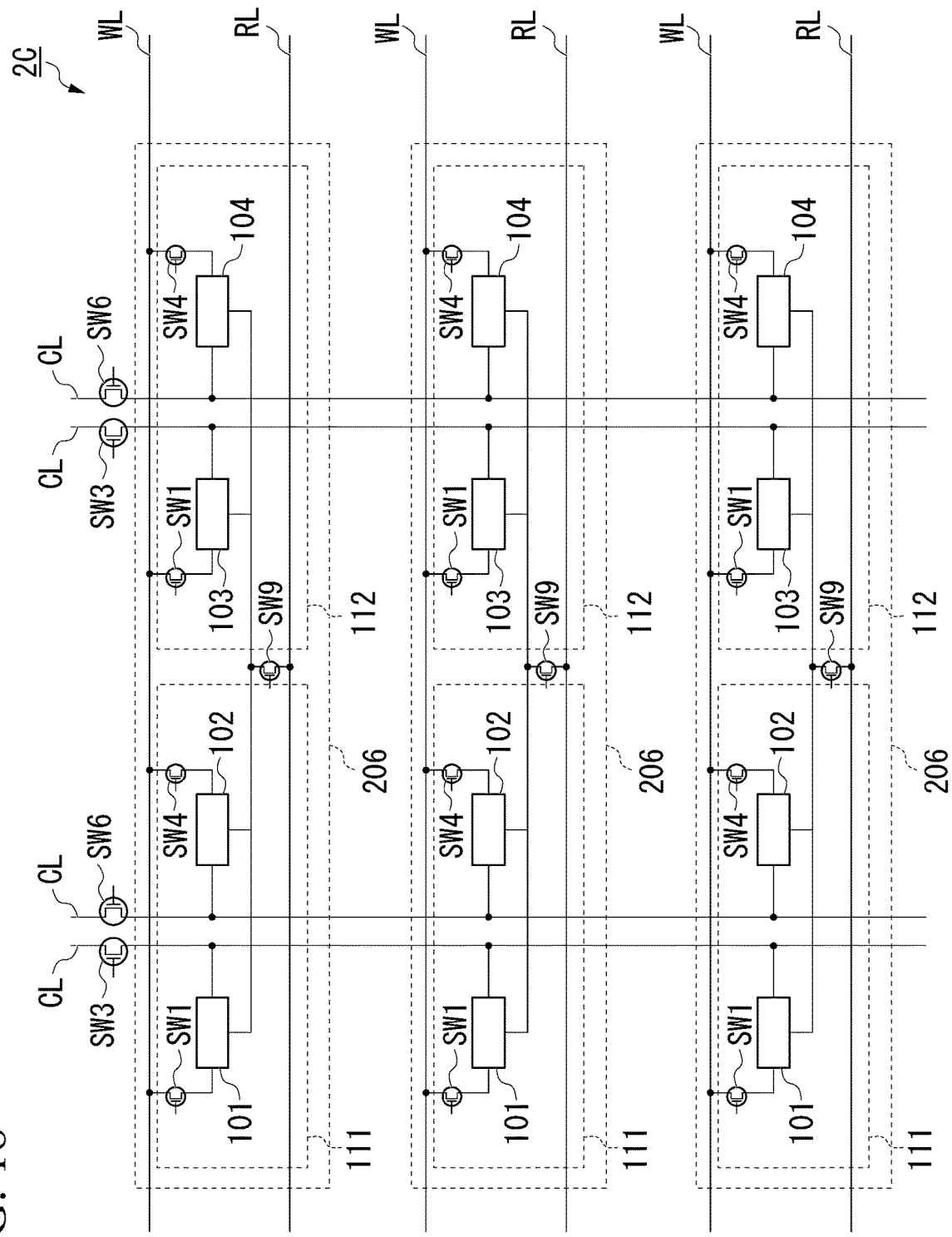
FIG. 18 is a circuit diagram of a memristor array according to a sixth embodiment.
Figure 19:
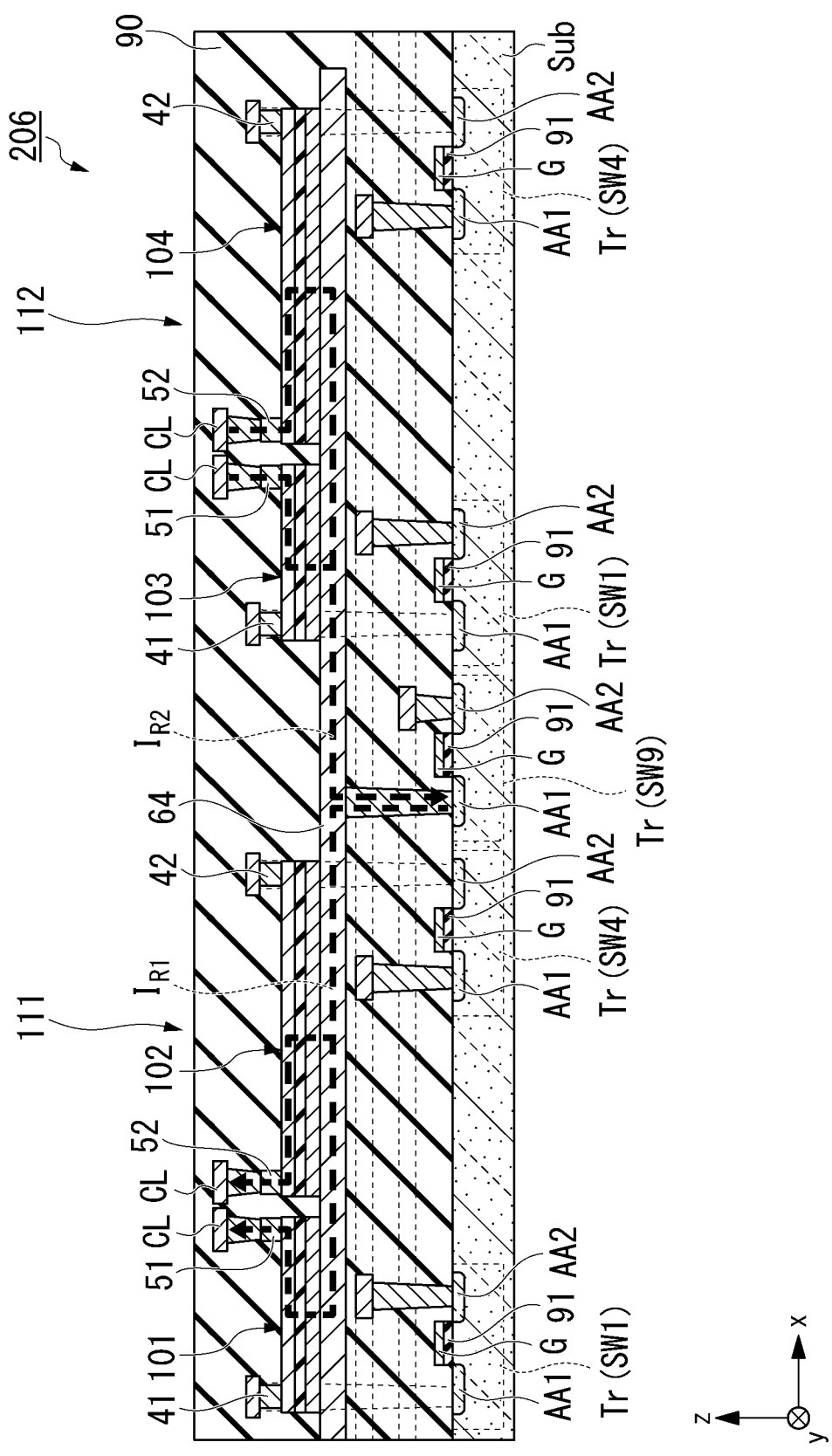
FIG. 19 is a cross-sectional view of a memristor according to the sixth embodiment.

FIG. 18 is a circuit diagram of a memristor array 2C according to a sixth embodiment. FIG. 19 is a cross-sectional view of a memristor 206 according to the sixth embodiment. FIG. 19 is a cross-section cut along an xz-plane passing through the center of the memristor 206 in the y-direction. In the memristor 206 according to the sixth embodiment, components similar to those in the memristor 201 according to the first embodiment are denoted by the same reference signs and description thereof is omitted.

The memristor 206 according to the sixth embodiment has a first pair element 111 and a second pair element 112. The first pair element 111 includes a variable conductance element 101 and a variable conductance element 102. The second pair element 112 includes a variable conductance element 103 and a variable conductance element 104. The variable conductance element 103 is similar to the variable conductance element 101. The variable conductance element 104 is similar to the variable conductance element 102.

The variable conductance elements 101, 102, 103, and 104 share an electrode 64 for reading. The electrode 64 is an example of a shared read electrode. The electrode 64 is connected to a switching element SW9. The switching element SW9 is turned on during a read operation of the memristor 206.

An operation of writing a signal to the memristor 206 will be described. When a signal is written to the memristor 206, a write current is applied to each of the variable conductance elements 101, 102, 103, and 104. A signal is written to each of the variable conductance elements 101, 102, 103, and 104 separately.

Next, an operation of reading a signal from the memristor 206 will be described. When a signal is read from a prescribed memristor 206, the switching elements SW3, SW6, and SW9 connected to the memristor 206 of a read target are turned on and the other switching elements are turned off.

The control device 3 allows a first read current $I_{R1}$ and a second read current $I_{R2}$ to flow through the memristor 206 for reading the signal. The first read current $I_{R1}$ flows inside the first pair element 111 (the variable conductance element 101 and the variable conductance element 102). The second read current $I_{R2}$ flows inside the second pair element 112 (the variable conductance element 103 and the variable conductance element 104). When the first read current $I_{R1}$ flows from the reference layer 31 to the magnetic recording layer 11 in the variable conductance element 101 and flows from the reference layer 32 to the magnetic recording layer 12 in the variable conductance element 102, the second read current $I_{R2}$ flows from the magnetic recording layer 11 to the reference layer 31 in the variable conductance element 103 and flows from the magnetic recording layer 12 to the reference layer 32 in the variable conductance element 104. In contrast, when the first read current $I_{R1}$ flows from the magnetic recording layer 11 to the reference layer 31 in the variable conductance element 101 and flows from the magnetic recording layer 12 to the reference layer 32 in the variable conductance element 102, the second read current $I_{R2}$ flows from the reference layer 31 to the magnetic recording layer 11 in the variable conductance element 103 and flows from the reference layer 32 to the magnetic recording layer 12 in the variable conductance element 104.

The control device 3 reverses a direction of the read current $I_{R1}$ flowing inside the first pair element 111 and a direction of the read current $I_{R2}$ flowing inside the second pair element 112. For example, the control device 3 reverses a direction (the +z-direction in FIG. 19) in which the first read current $I_{R1}$ passes through the nonmagnetic layers 21 and 22 and a direction (the −z-direction in FIG. 19) in which the second read current $I_{R2}$ passes through the nonmagnetic layers 21 and 22 in the z-direction.

For example, the first read current $I_{R1}$ flows from the electrode 64 to the electrodes 51 and 52 and the second read current $I_{R2}$ flows from the electrodes 51 and 52 to the electrode 64. Also, in contrast, the first read current $I_{R1}$ may flow from the electrodes 51 and 52 to the electrode 64 and the second read current $I_{R2}$ may flow from the electrode 64 to the electrodes 51 and 52. The flow directions of the first read current $I_{R1}$ and the second read current $I_{R2}$ can be controlled when the control device 3 sets the potentials of the electrodes 51, 52, and 64. If there is a potential difference between these electrodes, the read current can be regarded as having flowed.

It is possible to easily represent a positive weight and a negative weight in the neural network by reversing the flow directions of the first read current $I_{R1}$ and the second read current $I_{R2}$. Also, if the flow directions of the first read current $I_{R1}$ and the second read current $I_{R2}$ are reversed, directions of transient components generated in the first pair element 111 and the second pair element 112 are also reversed immediately after the application of the electric current and immediately after the application of the electric current is stopped. An unexpected operation can be prevented by canceling out the transient components, which are error factors in the read operation, between the first pair element 111 and the second pair element 112.

Also, when the memristor 206 according to the sixth embodiment is applied to a neuromorphic device, the first pair element 111 can have a positive weight and the second pair element 112 can have a negative weight. That is, a neuromorphic device using the memristor 206 can represent both positive and negative weights.

Although several embodiments of the present invention have been described in detail above, the present invention is not limited to these embodiments.

For example, the variable conductance elements constituting the memristor may be arranged in, for example, the y-direction, other than the x-direction. Also, longitudinal directions of the magnetic recording layers in the variable conductance elements constituting the memristor may not be coincident and current flow directions may not be coincident.

Figure 20:
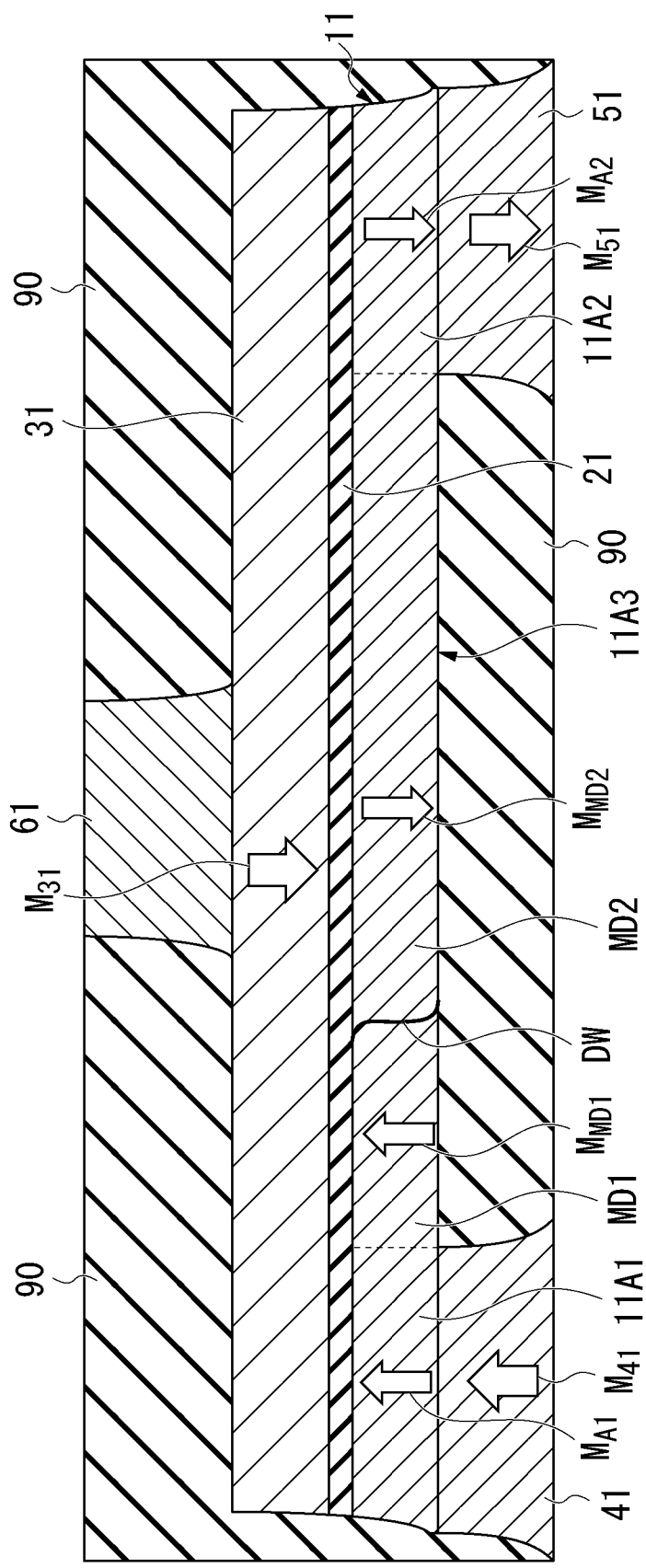
FIG. 20 is a cross-sectional view of a variable conductance element according to a modified example.
Figure 20:
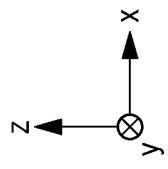

Also, for example, FIG. 20 is a cross-sectional view of a variable conductance element according to a modified example. In the variable conductance element according to the modified example, the reference layer 31 is located farther from the substrate Sub than the magnetic recording layer 11 is. The variable conductance element according to the modified example is called a top pin structure. The top pin structure is different from a bottom pin structure only in a positional relationship between the reference layer 31 and the magnetic recording layer 11. Thus, each of the variable conductance elements according to the first to sixth embodiments can be replaced with a top pin structure.

Also, the number of variable conductance elements constituting the memristor is not limited to two and may be more than two. For example, three variable conductance elements may be used and the conductance of the variable conductance elements may be added up. By adding up the conductance of three or more variable conductance elements, the memristor can represent more gradations.

Although an example in which the conductance of the variable conductance elements is added up by connecting the variable conductance elements constituting the memristor to the same third wiring RL (allowing the read paths to merge with each other) has been described, the variable conductance elements may be connected to separate wirings and the conductance of the variable conductance elements may be added up in an external device (for example, a computer or the like).

Although an example in which the magnetic domain wall moving element is used as an example of the variable conductance element constituting the memristor has been described above, the memristor is not limited to this example. For example, an element using a phase change memory (PCM), an element using a resistance change memory a resistive random access memory (ReRAM), or the like may be used as a memristor.

Figure 21:
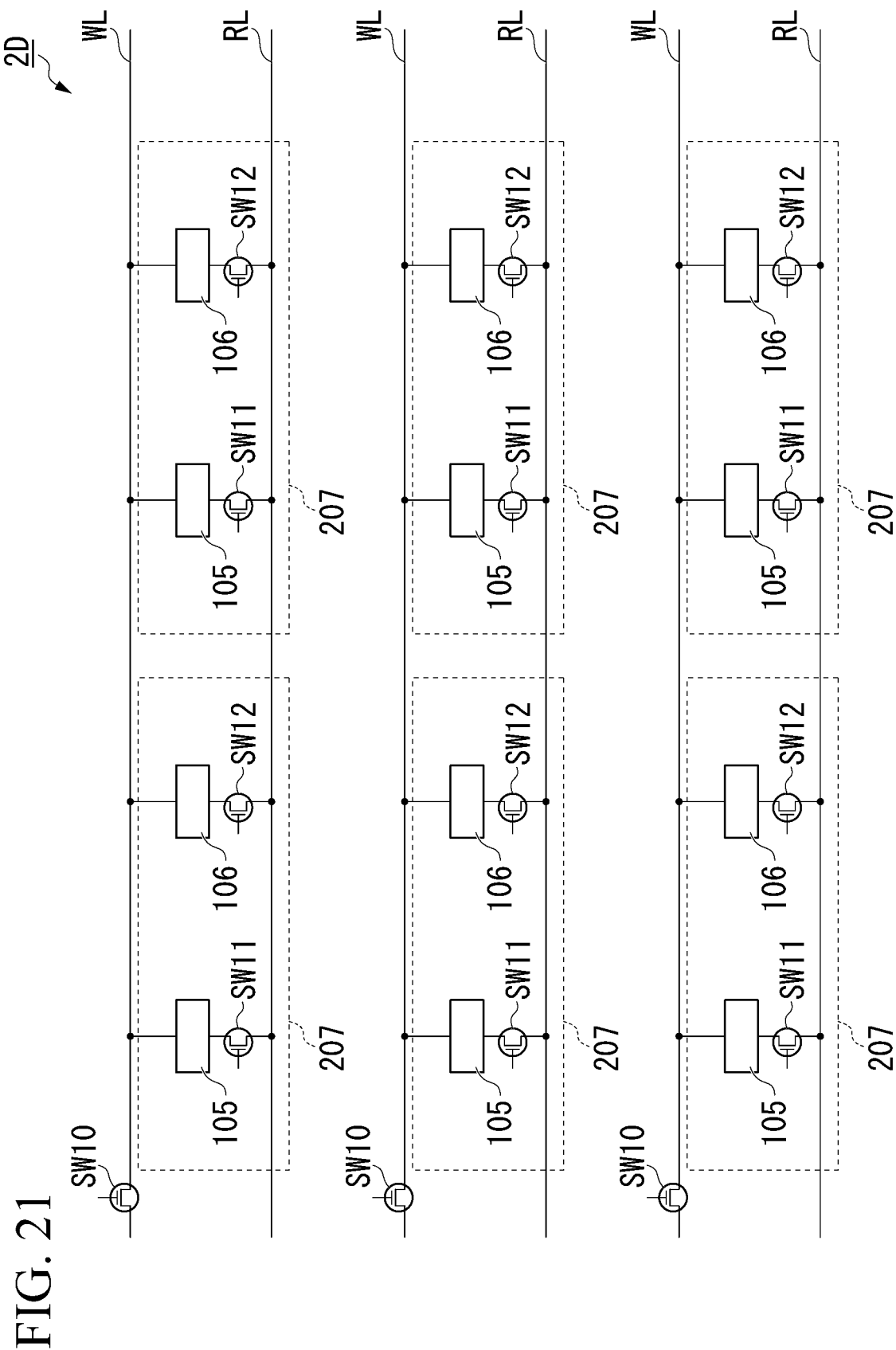
FIG. 21 is a circuit diagram of a memristor array according to the modified example.
Figure 22:
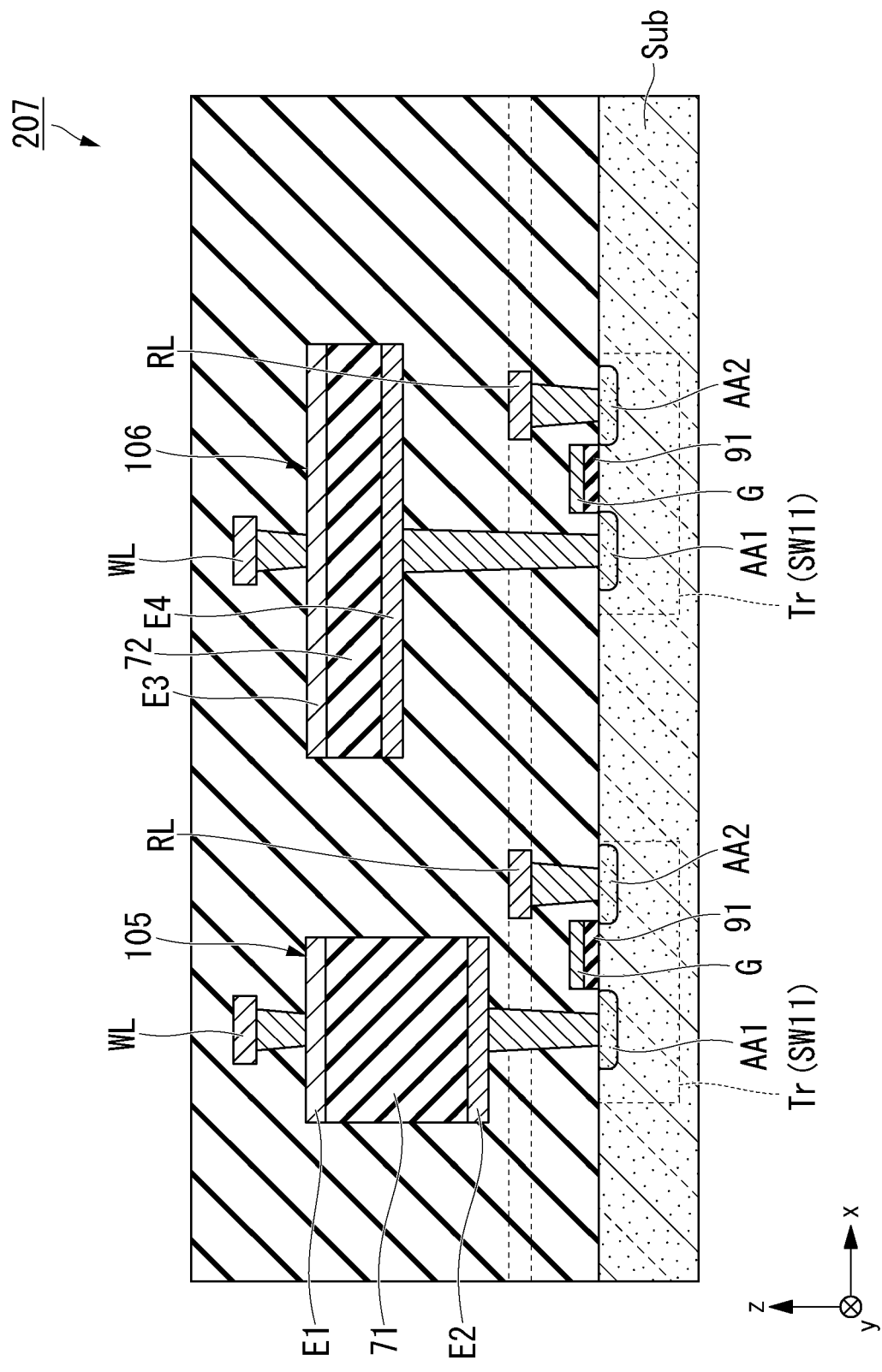
FIG. 22 is a cross-sectional view of a memristor according to the modified example.

For example, FIG. 21 is a circuit diagram of a memristor array 2D according to a modified example. FIG. 22 is a cross-sectional view of a memristor 207 according to the modified example. FIGS. 21 and 22 are examples using a phase change memory as the variable conductance element.

The memristor 207 has a variable conductance element 105 and a variable conductance element 106. A write operation and a read operation associated with the variable conductance element 105 are controlled by a switching element SW10 and a switching element SW11. A write operation and a read operation associated with the variable conductance element 106 are controlled by the switching element SW10 and a switching element SW12.

The variable conductance element 105 includes an electrode E1, an electrode E2, and a phase change layer 71. The phase change layer 71 is sandwiched between the electrode E1 and the electrode E2. The variable conductance element 106 includes an electrode E3, an electrode E4, and a phase change layer 72. The phase change layer 72 is sandwiched between the electrode E3 and the electrode E4.

The phase change layer 71 undergoes a phase change between crystalline and amorphous step by step in accordance with a potential between the electrode E1 and the electrode E2, and the resistance changes. The phase change layer 72 undergoes a phase change between crystalline and amorphous step by step in accordance with a potential between the electrode E3 and the electrode E4 and the resistance changes. A conductance range of the phase change layer 71 and a conductance range of the phase change layer 72 can be adjusted by changing a thickness, a material, an area, and the like of the phase change layer 71 or the phase change layer 72. The phase change layers 71 and 72 can use a known phase change material such as $Ge_2Sb_2Te_5$ (GST).

In the case of the ReRAM, the configuration is similar to those in FIGS. 21 and 22, except that the phase change layer is a metal oxide film. The ReRAM utilizes a resistance change by forming a filament using metal precipitation in a medium such as $TaO_2$. The types of variable conductance elements constituting the memristors may be the same or different.

The characteristic configurations of the embodiments and the modified examples described above may be combined and some of the characteristic configurations may be changed without departing from the spirit and scope of the invention.

EXPLANATION OF REFERENCES

1 Memristor device
2, 2A, 2B, 2C, 2D Memristor array
3 Control device
4 Signal input unit
5 Calculation unit
6 Output unit
7 Control unit
8 Power supply
11, 12 Magnetic recording layer
21, 22 Nonmagnetic layer
31, 32 Reference layer
41, 42, 51, 52, 53, 61, 62, 63, 64 Electrode
90 Insulating layer
91 Insulating film
101, 102, 103, 104, 105, 106 Variable conductance element
111 First pair element
112 Second pair element
201, 202, 203, 204, 205, 206, 207 Memristor

What is claimed is:

1. A memristor comprising:
a first variable conductance element; and
a second variable conductance element,
wherein a minimum value of conductance of the second variable conductance element during reading is larger than a maximum value of conductance of the first variable conductance element during reading, and
wherein a first read path when the conductance of the first variable conductance element is read merges with a second read path when the conductance of the second variable conductance element is read.

2. The memristor according to claim 1, wherein the first read path and the second read path are connected in parallel.

3. The memristor according to claim 1, wherein a conductance change range for a gradation of the second variable conductance element is larger than a conductance change range for a gradation of the first variable conductance element.

4. The memristor according to claim 3, wherein the conductance change range for a gradation of the second variable conductance element is larger than a maximum change range of the conductance of the first variable conductance element.

5. The memristor according to claim 4, wherein the conductance change range for a gradation of the second variable conductance element is less than or equal to a sum of the maximum change range of the conductance of the first variable conductance element and the conductance change range for a gradation of the first variable conductance element.

6. The memristor according to claim 1, wherein a lowest resistivity of the first variable conductance element is greater than a lowest resistivity of the second variable conductance element.

7. The memristor according to claim 1, wherein an area occupied by the first variable conductance element when viewed from above in a lamination direction is smaller than an area occupied by the second variable conductance element when viewed from above in the lamination direction.

8. The memristor according to claim 1, further comprising:
a first switching element connected to the first variable conductance element and configured to control a write current for the first variable conductance element; and
a second switching element connected to the second variable conductance element and configured to control a write current for the second variable conductance element,
wherein an area of the first switching element is smaller than an area of the second switching element when viewed from above in a lamination direction.

9. The memristor according to claim 1, wherein the first variable conductance element and the second variable conductance element are at different height positions in a lamination direction.

10. The memristor according to claim 1, wherein the number of gradations of the second variable conductance element is larger than the number of gradations of the first variable conductance element.

11. The memristor according to claim 1, wherein the number of gradations of the second variable conductance element is smaller than the number of gradations of the first variable conductance element.

12. The memristor according to claim 1,
wherein the first variable conductance element includes
a first reference layer;
a first magnetic recording layer;
a first nonmagnetic layer between the first reference layer and the first magnetic recording layer;
a first electrode electrically connected to the first magnetic recording layer; and
a second electrode separated from the first electrode and electrically connected to the first magnetic recording layer, and
wherein the second variable conductance element includes
a second reference layer;
a second magnetic recording layer;
a second nonmagnetic layer between the second reference layer and the second magnetic recording layer;
a third electrode electrically connected to the second magnetic recording layer; and
a fourth electrode separated from the third electrode and electrically connected to the second magnetic recording layer.

13. The memristor according to claim 12, wherein a length of the first magnetic recording layer in a first width direction perpendicular to a line segment connecting the first electrode and the second electrode along the first magnetic recording layer is shorter than a length of the second magnetic recording layer in a second width direction perpendicular to a line segment connecting the third electrode and the fourth electrode along the second magnetic recording layer.

14. The memristor according to claim 12, further comprising a shared read electrode,
wherein the shared read electrode is connected to the first reference layer and the second reference layer.

15. The memristor according to claim 14, wherein the second electrode and the fourth electrode are connected and integrated.

16. The memristor according to claim 15, wherein a read current flows between the shared read electrode and the second electrode and between the shared read electrode and the fourth electrode.

17. The memristor according to claim 14, comprising:
a first pair element including the first variable conductance element and the second variable conductance element; and
a second pair element including a third variable conductance element identical to the first variable conductance element and a fourth variable conductance element identical to the second variable conductance element,
wherein the first variable conductance element, the second variable conductance element, the third variable conductance element, and the fourth variable conductance element are connected to the same shared read electrode, wherein when a read current flows from the first reference layer to the first magnetic recording layer in the first variable conductance element and a read current flows from the second reference layer to the second magnetic recording layer in the second variable conductance element,
a read current flows from the first magnetic recording layer to the first reference layer in the third variable conductance element and a read current flows from the second magnetic recording layer to the second reference layer in the fourth variable conductance element, and
wherein when a read current flows from the first magnetic recording layer to the first reference layer in the first variable conductance element and a read current flows from the second magnetic recording layer to the second reference layer in the second variable conductance element,
a read current flows from the first reference layer to the first magnetic recording layer in the third variable conductance element and a read current flows from the second reference layer to the second magnetic recording layer in the fourth variable conductance element.

18. A memristor comprising:
a first variable conductance element; and
a second variable conductance element,
wherein a minimum value of conductance of the second variable conductance element during reading is larger than a maximum value of conductance of the first variable conductance element during reading, and
wherein the memristor sums the conductance of the first variable conductance element and the conductance of the second variable conductance element.

19. A neuromorphic device comprising:
a plurality of memristors; and
a control device configured to control the plurality of memristors,
wherein each of the plurality of memristors is the memristor according to claim 1,
wherein the control device configured to change only the conductance of the second variable conductance element in at least one memristor of the plurality of memristors in a first step of learning, and
wherein the control device configured to change at least the conductance of the first variable conductance element in at least one memristor of the plurality of memristors in a second step of learning.

20. A neuromorphic device comprising:
a plurality of memristors; and
a control device configured to control the plurality of memristors,
wherein each of the plurality of memristors is the memristor according to claim 1,
wherein the control device configured to change at least the conductance of the second variable conductance element in at least one memristor of the plurality of memristors in a first step of learning, and
wherein the control device configured to change only the conductance of the first variable conductance element in at least one memristor of the plurality of memristors in a second step of learning.

* * * * *